US011452126B2

(12) United States Patent
Li

(10) Patent No.: US 11,452,126 B2
(45) Date of Patent: Sep. 20, 2022

(54) COMMUNICATION METHOD AND COMMUNICATIONS APPARATUS

(71) Applicant: Huawei Technologies Co., Ltd., Shenzhen (CN)

(72) Inventor: Yuan Li, Bonn (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 66 days.

(21) Appl. No.: 17/093,110

(22) Filed: Nov. 9, 2020

(65) Prior Publication Data

US 2021/0058954 A1 Feb. 25, 2021

Related U.S. Application Data

(63) Continuation of application No. PCT/CN2018/086575, filed on May 11, 2018.

(51) Int. Cl.
*H04W 72/12* (2009.01)
*H04W 72/04* (2009.01)

(52) U.S. Cl.
CPC ... *H04W 72/1273* (2013.01); *H04W 72/0413* (2013.01); *H04W 72/0446* (2013.01)

(58) Field of Classification Search
CPC ......... H04W 72/1273; H04W 72/0413; H04W 72/0446
USPC ....................................................... 370/329
See application file for complete search history.

(56) References Cited

U.S. PATENT DOCUMENTS

| 10,334,627 | B2 | 6/2019 | Larsson et al. |
| 2017/0222749 | A1 | 8/2017 | Dinan |
| 2017/0325225 | A1* | 11/2017 | Dinan ............... H04W 72/0446 |
| 2018/0132235 | A1 | 5/2018 | Hosseini et al. |

(Continued)

FOREIGN PATENT DOCUMENTS

| CN | 102668668 A | 9/2012 |
| CN | 106455103 A | 2/2017 |
| RU | 2653495 C1 | 5/2018 |

OTHER PUBLICATIONS

"Remaining Issues on Multiple Starting and Ending Points for LAA UL," Source: Ericsson, Agenda Item: 6.2.2.1, Document for: Discussion and Decision, 3GPP TSG-RAN WG1 Meeting #91, R1-1720369, Reno, USA, Nov. 27-Dec. 1, 2017, 7 pages.

(Continued)

*Primary Examiner* — Chi Tang P Cheng
(74) *Attorney, Agent, or Firm* — Slater Matsil, LLP

(57) ABSTRACT

A communication method and a communications apparatus, the method including receiving scheduling information from a network device, where the scheduling information is used to indicate at least one uplink subframe, and the scheduling information includes a first indication field and a second indication field, the first indication field is used to indicate whether each of the at least one uplink subframe is applicable to a first mode, and the second indication field is used to indicate whether a first uplink subframe is applicable to a second mode, and when the first indication field indicates that each of the at least one uplink subframe is applicable to the first mode and the second indication field indicates that the first uplink subframe is applicable to the second mode, sending first uplink information in the first uplink subframe by using the second mode.

18 Claims, 9 Drawing Sheets

(56) References Cited

U.S. PATENT DOCUMENTS

2020/0170006 A1* 5/2020 Wang ............... H04W 72/0446

OTHER PUBLICATIONS

"Discussion on Multiple Starting and Ending Positions for LAA UL," Agenda Item: 6.2.2.1, Source: LG Electronics, Document for: Discussion and decision, 3GPP TSG RAN WG1 Meeting #92, R1-1802152, Athens, Greece, Feb. 26-Mar. 2, 2018, 4 pages.

"3rd Generation Partnership Project; Technical Specification Group Radio Access Network; Evolved Universal Terrestrial Radio Access (E-UTRA); Multiplexing and channel coding (Release 15)," 3GPP TS 36.212 V15.1.0, Mar. 2018, 227 pages.

"3rd Generation Partnership Project; Technical Specification Group Radio Access Network; Evolved Universal Terrestrial Radio Access (E-UTRA); Physical layer procedures (Release 15)," 3GPP TS 36.213 V15.1.0, Mar. 2018, 500 pages.

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.6.2, Apr. 2018, 766 pages.

"3rd Generation Partnership Project; Technical Specification Group Radio Access Network; Physical layer procedures for shared spectrum channel access (Release 15)," 3GPP TS 37.213 V0.0.1, Apr. 2018, 19 pages.

"On Channel Access for AUL," Agenda Item: 6.2.2.3.3, Source: Huawei, HiSilicon, Document for: Discussion and decision, 3GPP TSG RAN WG1 Meeting #90bis, R1-1717117, Prague, Czech Republic, Oct. 9-13, 2017, 5 pages.

"Remaining Issues on AUL Channel Access," Agenda Item: 6.2.2.2.3, Source: Huawei, HiSilicon, Document for: Discussion and decision, 3GPP TSG RAN WG1 Meeting #91, R1-1719500, Reno, USA, Nov. 27-Dec. 1, 2017, 6 pages.

"Remaining Details on AUL Channel Access," Agenda Item: 6.2.2.2.3, Source: Huawei, HiSilicon, Document for: Discussion and decision, 3GPP TSG RAN WG1 Meeting #92, R1-1801375, Athens, Greece, Feb. 26-Mar. 2, 2018, 7 pages.

"Multiple Starting and Ending Positions in a Subframe for UL," Agenda item: 6.2.2.1, Source: Nokia, Nokia Shanghai Bell, Document for: Discussion and Decision, 3GPP TSG RAN WG1 Meeting #92, R1-1802264, Athens, Greece, Feb. 26-Mar. 2, 2018, 5 pages.

"Remaining Issues on Multiple Starting and Ending Points for LAA UL," Source: Ericsson, Agenda Item: 6.2.2.1, Document for: Discussion and Decision, 3GPP TSG RAN WG1 Meeting #92, R1-1802531, Athens, Greece, Feb. 26-Mar. 2, 2018, 4 pages.

* cited by examiner

COMMUNICATION METHOD AND COMMUNICATIONS APPARATUS

CROSS-REFERENCE TO RELATED APPLICATION

This application is a continuation of International Application No. PCT/CN2018/086575, filed on May 11, 2018, the disclosure of which is hereby incorporated by reference in its entirety.

TECHNICAL FIELD

This application relates to the communications field, and more specifically, to a communication method and a communications apparatus.

BACKGROUND

In a fourth generation (4G) mobile communication technology, a licensed-assisted access using long term evolution (Licensed-Assisted Access using Long Term Evolution, LAA-LTE) technology is introduced in Release 13, an enhanced licensed-assisted access (enhanced LAA, eLAA) technology is introduced in Release 14, and a further enhanced licensed-assisted access (Further enhanced LAA, FeLAA) technology is introduced in Release 15. An available spectrum may be extended to an unlicensed frequency band of 5 GHz by using a carrier aggregation (Carrier Aggregation, CA) technology. With assistance of a licensed spectrum, downlink and uplink information is transmitted on an unlicensed spectrum. Based on LAA and eLAA, the MulteFire standard further implements uplink and downlink transmission of a long term evolution (LTE) system in an unlicensed spectrum completely in standalone mode, without depending on assistance of a licensed spectrum.

Three partial subframe transmission modes (Mode A, Mode B, and Mode C) are specifically introduced in FeLAA. A network device indicates, by using an uplink grant (UL Grant), the terminal device to use one or more of the three partial subframe transmission modes. In an existing partial subframe transmission process, when the network device indicates a plurality of partial subframe transmission modes to the terminal device, indications of the plurality of partial subframe transmission modes may conflict with each other. To avoid the conflicts, the network device needs to indicate the terminal device not to simultaneously enable the partial subframe transmission modes that conflict with each other. Consequently, indication flexibility of a transmission mode of an uplink subframe is relatively low.

SUMMARY

In view of this, this application provides a communication method and a communications apparatus, to improve indication flexibility of a transmission mode of an uplink subframe.

According to a first aspect, a communication method is provided. The method includes receiving, by a terminal device, scheduling information from a network device, where the scheduling information is used to indicate at least one uplink subframe, the scheduling information includes a first indication field and a second indication field, the first indication field is used to indicate whether each of the at least one uplink subframe is applicable to a first mode, the second indication field is used to indicate whether a first uplink subframe is applicable to a second mode, and the at least one uplink subframe includes the first uplink subframe, and when the first indication field indicates that each of the at least one uplink subframe is applicable to the first mode and the second indication field indicates that the first uplink subframe is applicable to the second mode, sending, by the terminal device, first uplink information in the first uplink subframe by using the second mode.

In some possible implementations, the at least one uplink subframe is at least two uplink subframes.

In some possible implementations, the at least one uplink subframe is all uplink subframes scheduled by using the scheduling information.

Therefore, according to the communication method in this embodiment of this application, the network device is allowed to indicate a plurality of transmission modes of an uplink subframe in the scheduling information, and a behavior of the terminal device for a plurality of subframes whose transmission modes conflict with each other is defined. This helps improve indication flexibility of a transmission mode of an uplink subframe.

With reference to the first aspect, in some possible implementations of the first aspect, the sending, by the terminal device, first uplink information in the first uplink subframe by using the second mode includes starting to send, by the terminal device, the first uplink information in the $2^{nd}$ slot of the first uplink subframe, where the first uplink subframe is the $1^{st}$ uplink subframe in the at least one uplink subframe.

In some possible implementations, the sending, by the terminal device, first uplink information in the first uplink subframe by using the second mode includes mapping, by the terminal device, the first uplink information carried in the first uplink subframe to the $2^{nd}$ slot of the first uplink subframe instead of to the $1^{st}$ slot of the first uplink subframe.

With reference to the first aspect, in some possible implementations of the first aspect, the sending, by the terminal device, first uplink information in the first uplink subframe by using the second mode includes stopping sending the first uplink information in the $1^{st}$ slot of the first uplink subframe, where the first uplink subframe is the last uplink subframe in the at least one uplink subframe.

In some possible implementations, the sending, by the terminal device, first uplink information in the first uplink subframe by using the second mode includes mapping, by the terminal device, the first uplink information carried in the first uplink subframe to the $1^{st}$ slot of the first uplink subframe instead of to the $2^{nd}$ slot of the first uplink subframe.

In some possible implementations, the method further includes when the first indication field indicates that each of the at least one uplink subframe is applicable to the first mode and the second indication field indicates that the first uplink subframe is not applicable to the second mode, sending, by the terminal device, sixth uplink information in the first uplink subframe by using the first mode.

In some possible implementations, the sending, by the terminal device, sixth uplink information in the first uplink subframe by using the first mode includes stopping sending, by the terminal device, the sixth uplink information in the $2^{nd}$ slot of the first uplink subframe.

In some possible implementations, the sending, by the terminal device, sixth uplink information in the first uplink subframe by using the first mode includes mapping, by the terminal device, uplink information carried in the first uplink subframe to two slots of the first uplink subframe.

In some possible implementations, the uplink information carried in the first uplink subframe includes the sixth uplink information.

With reference to the first aspect, in some possible implementations of the first aspect, the method further includes sending, by the terminal device, second uplink information in a second uplink subframe by using the first mode, where the second uplink subframe is any uplink subframe other than the first uplink subframe in the at least one uplink subframe.

With reference to the first aspect, in some possible implementations of the first aspect, the sending, by the terminal device, second uplink information in a second uplink subframe by using the first mode includes determining, by the terminal device based on a channel listening result, that a starting moment for sending the second uplink information in the second uplink subframe is located in the $1^{st}$ slot of the second uplink subframe or the $2^{nd}$ slot of the second uplink subframe, and sending, by the terminal device, the second uplink information in the second uplink subframe.

In some possible implementations, the sending, by the terminal device, second uplink information in a second uplink subframe by using the first mode includes stopping sending, by the terminal device, the second uplink information in the $2^{nd}$ slot of the second uplink subframe.

In some possible implementations, the sending, by the terminal device, second uplink information in a second uplink subframe by using the first mode includes mapping, by the terminal device, uplink information carried in the second uplink subframe to two slots of the second uplink subframe.

In some possible implementations, the uplink information carried in the second uplink subframe includes the second uplink information.

With reference to the first aspect, in some possible implementations of the first aspect, the scheduling information further includes a third indication field, the third indication field is used to indicate whether a third uplink subframe is applicable to a third mode, the at least one uplink subframe includes the third uplink subframe, and the method further includes when the first indication field indicates that each of the at least one uplink subframe is applicable to the first mode, the second indication field indicates that the first uplink subframe is applicable to the second mode, and the third indication field indicates that the third uplink subframe is applicable to the third mode, sending, by the terminal device, third uplink information in the first uplink subframe by using the second mode, and sending, by the terminal device, fourth uplink information in the third uplink subframe by using the third mode.

Therefore, according to the communication method in this embodiment of this application, the network device is allowed to indicate a plurality of transmission modes of an uplink subframe in the scheduling information, and a behavior of the terminal device for a plurality of subframes whose transmission modes conflict with each other is defined. This helps improve indication flexibility of a transmission mode of an uplink subframe.

With reference to the first aspect, in some possible implementations of the first aspect, the method further includes sending, by the terminal device, fifth uplink information in a second uplink subframe by using the first mode, where the second uplink subframe is any uplink subframe other than the first uplink subframe and the third uplink subframe in the at least one uplink subframe.

With reference to the first aspect, in some possible implementations of the first aspect, the sending, by the terminal device, third uplink information in the first uplink subframe by using the second mode, and sending, by the terminal device, fourth uplink information in the third uplink subframe by using the third mode includes starting to send, by the terminal device, the third uplink information in the $2^{nd}$ slot of the first uplink subframe, where the first uplink subframe is the $1^{st}$ uplink subframe in the at least one uplink subframe, and stopping sending, by the terminal device, the fourth uplink information in the $1^{st}$ slot of the third uplink subframe, where the third uplink subframe is the last uplink subframe in the at least one uplink subframe.

In some possible implementations, the sending, by the terminal device, third uplink information in the first uplink subframe by using the second mode includes mapping, by the terminal device, the third uplink information carried in the first uplink subframe to the $2^{nd}$ slot of the first uplink subframe instead of to the $1^{st}$ slot of the first uplink subframe.

In some possible implementations, the sending, by the terminal device, fourth uplink information in the third uplink subframe by using the third mode includes mapping, by the terminal device, the fourth uplink information carried in the third uplink subframe to the $1^{st}$ slot of the third uplink subframe instead of to the $2^{nd}$ slot of the third uplink subframe.

In some possible implementations, the sending, by the terminal device, fifth uplink information in a second uplink subframe by using the first mode includes determining, by the terminal device based on a channel listening result, that a starting moment for sending the fifth uplink information in the second uplink subframe is located in the $1^{st}$ slot of the second uplink subframe or the $2^{nd}$ slot of the second uplink subframe, and sending, by the terminal device, the fifth uplink information in the second uplink subframe.

In some possible implementations, the sending, by the terminal device, fifth uplink information in a second uplink subframe by using the first mode includes stopping sending, by the terminal device, the fifth uplink information in the $2^{nd}$ slot of the second uplink subframe.

In some possible implementations, the sending, by the terminal device, fifth uplink information in a second uplink subframe by using the first mode includes mapping, by the terminal device, uplink information carried in the second uplink subframe to two slots of the second uplink subframe.

In some possible implementations, the uplink information carried in the second uplink subframe includes the fifth uplink information.

In some possible implementations, the method further includes when the first indication field indicates that each of the at least one uplink subframe is applicable to the first mode, the second indication field indicates that the first uplink subframe is not applicable to the second mode, and the third indication field indicates that the third uplink subframe is not applicable to the third mode, sending, by the terminal device, uplink information in any of the at least one uplink subframe by using the first mode.

In some possible implementations, the sending, by the terminal device, uplink information in any of the at least one uplink subframe by using the first mode includes determining, by the terminal device based on a channel listening result, that a starting moment for sending the uplink information in any of the at least one uplink subframe is located in the $1^{st}$ slot of any of the at least one uplink subframe or the $2^{nd}$ slot of any of the at least one uplink subframe, and sending, by the terminal device, the uplink information in any of the at least one uplink subframe.

In some possible implementations, the sending, by the terminal device, uplink information in any of the at least one uplink subframe by using the first mode includes stopping sending, by the terminal device, the uplink information in the $2^{nd}$ slot of any uplink subframe.

In some possible implementations, the sending, by the terminal device, uplink information in any of the at least one uplink subframe by using the first mode includes mapping, by the terminal device, the uplink information carried in the any uplink subframe to two slots of the any uplink subframe.

According to a second aspect, a communication method is provided. The method includes sending, by a network device, scheduling information to a terminal device, where the scheduling information is used to indicate at least one uplink subframe, the scheduling information includes a first indication field and a second indication field, the first indication field is used to indicate whether each of the at least one uplink subframe is applicable to a first mode, the second indication field is used to indicate whether a first uplink subframe is applicable to a second mode, and the at least one uplink subframe includes the first uplink subframe, and when the first indication field indicates that each of the at least one uplink subframe is applicable to the first mode and the second indication field indicates that the first uplink subframe is applicable to the second mode, receiving, by the network device, first uplink information sent by the terminal device in the first uplink subframe by using the second mode.

In some possible implementations, the at least one uplink subframe is at least two uplink subframes.

In some possible implementations, the at least one uplink subframe is all uplink subframes scheduled by using the scheduling information.

Therefore, according to the communication method in this embodiment of this application, the network device is allowed to indicate a plurality of transmission modes of an uplink subframe in the scheduling information, and a behavior of the terminal device for a plurality of subframes whose transmission modes conflict with each other is defined. This helps improve indication flexibility of a transmission mode of an uplink subframe.

With reference to the second aspect, in some possible implementations of the second aspect, the terminal device starts to send the first uplink information in the $2^{nd}$ slot of the first uplink subframe, and the first uplink subframe is the $1^{st}$ uplink subframe in the at least one uplink subframe.

In some possible implementations, the terminal device maps the first uplink information to the $2^{nd}$ slot of the first uplink subframe instead of to the $1^{st}$ slot of the first uplink subframe.

With reference to the second aspect, in some possible implementations of the second aspect, the terminal device stops sending the first uplink information in the $1^{st}$ slot of the first uplink subframe, and the first uplink subframe is the last uplink subframe in the at least one uplink subframe.

In some possible implementations, the terminal device maps the first uplink information to the $1^{st}$ slot of the first uplink subframe instead of to the $2^{nd}$ slot of the first uplink subframe.

In some possible implementations, the method further includes when the first indication field indicates that each of the at least one uplink subframe is applicable to the first mode and the second indication field indicates that the first uplink subframe is not applicable to the second mode, receiving, by the network device, sixth uplink information sent by the terminal device in the first uplink subframe by using the first mode.

In some possible implementations, the terminal device stops sending the sixth uplink information in the $2^{nd}$ slot of the first uplink subframe.

In some possible implementations, the terminal device maps the sixth uplink information to two slots of the first uplink subframe.

In some possible implementations, the uplink information carried in the first uplink subframe includes the sixth uplink information.

With reference to the second aspect, in some possible implementations of the second aspect, the method further includes receiving, by the network device, second uplink information sent by the terminal device in a second uplink subframe by using the first mode, where the second uplink subframe is any uplink subframe other than the first uplink subframe in the at least one uplink subframe.

With reference to the second aspect, in some possible implementations of the second aspect, a start sending moment of the second uplink information in the second uplink subframe is determined by the terminal device based on a channel listening result, and the start sending moment is located in the $1^{st}$ slot of the second uplink subframe or the $2^{nd}$ slot of the second uplink subframe.

In some possible implementations, the terminal device stops sending the second uplink information in the $2^{nd}$ slot of the second uplink subframe.

In some possible implementations, the terminal device maps uplink information carried in the second uplink subframe to two slots of the second uplink subframe.

In some possible implementations, the uplink information carried in the second uplink subframe includes the second uplink information.

With reference to the second aspect, in some possible implementations of the second aspect, the scheduling information further includes a third indication field, the third indication field is used to indicate whether a third uplink subframe is applicable to a third mode, the at least one uplink subframe includes the third uplink subframe, and the method further includes when the first indication field indicates that each of the at least one uplink subframe is applicable to the first mode, the second indication field indicates that the first uplink subframe is applicable to the second mode, and the third indication field indicates that the third uplink subframe is applicable to the third mode, receiving, by the network device, third uplink information sent by the terminal device in the first uplink subframe by using the second mode, and receiving, by the network device, fourth uplink information sent by the terminal device in the third uplink subframe by using the third mode.

Therefore, according to the communication method in this embodiment of this application, the network device is allowed to indicate a plurality of transmission modes of an uplink subframe in the scheduling information, and a behavior of the terminal device for a plurality of subframes whose transmission modes conflict with each other is defined. This helps improve indication flexibility of a transmission mode of an uplink subframe.

With reference to the second aspect, in some possible implementations of the second aspect, the method further includes receiving, by the network device, fifth uplink information sent by the terminal device in a second uplink subframe by using the first mode, where the second uplink subframe is any uplink subframe other than the first uplink subframe and the third uplink subframe in the at least one uplink subframe.

With reference to the second aspect, in some possible implementations of the second aspect, the terminal device starts to send the third uplink information in the $2^{nd}$ slot of the first uplink subframe, the first uplink subframe is the $1^{st}$ uplink subframe in the at least one uplink subframe, the terminal device stops sending the fourth uplink information in the $1^{st}$ slot of the third uplink subframe, and the third uplink subframe is the last uplink subframe in the at least one uplink subframe.

In some possible implementations, the terminal device maps the third uplink information to the $2^{nd}$ slot of the first uplink subframe instead of to the $1^{st}$ slot of the first uplink subframe.

In some possible implementations, the terminal device maps the fourth uplink information to the $1^{st}$ slot of the third uplink subframe instead of to the $2^{nd}$ slot of the third uplink subframe.

In some possible implementations, the terminal device stops sending the fifth uplink information in the $2^{nd}$ slot of the second uplink subframe.

In some possible implementations, the terminal device maps uplink information carried in the second uplink subframe to two slots of the second uplink subframe.

In some possible implementations, the uplink information carried in the second uplink subframe includes the fifth uplink information.

In some possible implementations, the method further includes when the first indication field indicates that each of the at least one uplink subframe is applicable to the first mode, the second indication field indicates that the first uplink subframe is not applicable to the second mode, and the third indication field indicates that the third uplink subframe is not applicable to the third mode, receiving, by the network device, uplink information sent by the terminal device in any of the at least one uplink subframe by using the first mode.

In some possible implementations, a start sending moment of the uplink information sent in any of the at least one uplink subframe is determined by the terminal device based on a channel listening result, and the start sending moment is located in the $1^{st}$ slot of any of the at least one uplink subframe or the $2^{nd}$ slot of any of the at least one uplink subframe.

In some possible implementations, the terminal device stops sending the uplink information in the $2^{nd}$ slot of any uplink subframe.

In some possible implementations, the terminal device maps uplink information carried in the any uplink subframe to two slots of the any uplink subframe.

According to a third aspect, a communications apparatus is provided. The communications apparatus may be configured to perform the operations of the terminal device in any one of the first aspect or the possible implementations of the first aspect. Specifically, the communications apparatus may include modules and units configured to perform the operations of the terminal device in any one of the first aspect or the possible implementations of the first aspect.

According to a fourth aspect, a communications apparatus is provided. The communications apparatus may be configured to perform the operations of the network device in any one of the second aspect or the possible implementations of the second aspect. Specifically, the communications apparatus may include modules and units configured to perform the operations of the network device in any one of the second aspect or the possible implementations of the second aspect.

According to a fifth aspect, a terminal device is provided. The terminal device includes a processor, a transceiver, and a memory. The processor, the transceiver, and the memory communicate with each other through an internal connection path. The memory is configured to store an instruction, and the processor is configured to execute the instruction stored in the memory. When the processor executes the instruction stored in the memory, the execution enables the terminal device to perform the method according to any one of the first aspect or the possible implementations of the first aspect, or the execution enables the terminal device to implement the communications apparatus provided in the third aspect.

According to a sixth aspect, a network device is provided. The network device includes a processor, a transceiver, and a memory. The processor, the transceiver, and the memory communicate with each other through an internal connection path. The memory is configured to store an instruction, and the processor is configured to execute the instruction stored in the memory. When the processor executes the instruction stored in the memory, the execution enables the network device to perform the method according to any one of the second aspect or the possible implementations of the second aspect, or the execution enables the network device to implement the communications apparatus provided in the fourth aspect.

According to a seventh aspect, a chip system is provided, including a memory and a processor. The memory is configured to store a computer program, and the processor is configured to invoke the computer program from the memory and run the computer program, so that a communications device onto which the chip system is installed performs the method according to any one of the first aspect, the second aspect, or the possible implementations thereof.

According to an eighth aspect, a computer program product is provided. The computer program product includes computer program code. When the computer program code is run by a communications unit, a processing unit or a transceiver, and a processor of a communications device (such as a network device or a terminal device), the communications device is enabled to perform the method according to any one of the first aspect, the second aspect, or the possible implementations thereof.

According to a ninth aspect, a computer-readable storage medium is provided. The computer-readable storage medium stores a program. The program enables a communications device (such as a network device or a terminal device) to perform the method according to any one of the first aspect, the second aspect, or the possible implementations thereof.

According to a tenth aspect, a computer program is provided. When the computer program is executed on a computer, the computer is enabled to implement the method according to any one of the first aspect, the second aspect, and the possible implementations thereof.

According to an eleventh aspect, a communications system is provided. The communications system includes the communications apparatus provided in the third aspect and/or the communications apparatus provided in the fourth aspect, or the communications system includes the terminal device provided in the fifth aspect and/or the network device provided in the sixth aspect.

DETAILED DESCRIPTION OF ILLUSTRATIVE EMBODIMENTS

The following describes technical solutions of this application with reference to the accompanying drawings.

The technical solutions in the embodiments of this application may be applied to various communications systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future $5^{th}$ generation (5G) system or new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. Alternatively, the terminal device may be a cellular phone, a cordless telephone set, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

A network device in the embodiments of this application may be a device configured to communicate with the terminal device. The network device may be a base transceiver station (BTS) in a global system for mobile communications (GSM) system or a code division multiple access (CDMA) system, may be a NodeB (NB) in a wideband code division multiple access (WCDMA) system, may be an evolved NodeB (Evolutional NodeB, eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

Figure 1:
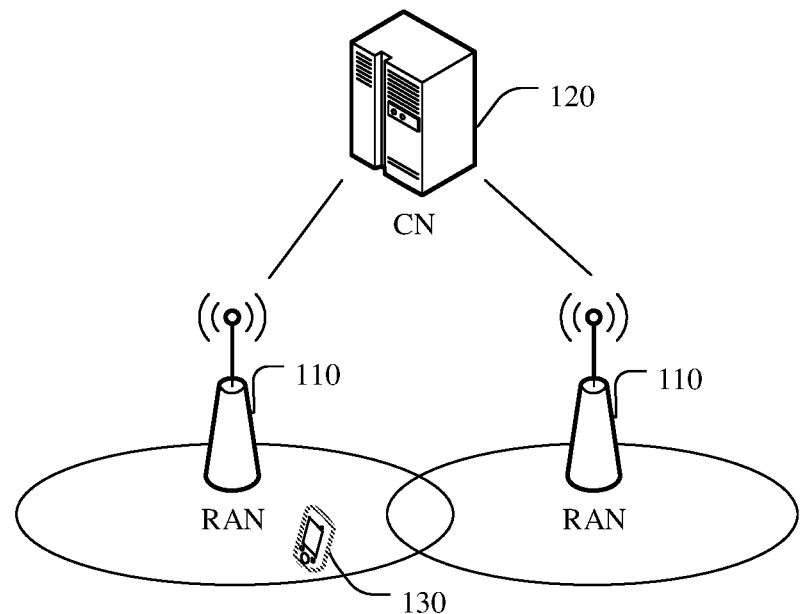
FIG. 1 is a schematic diagram of a communications system according to an embodiment of this application.

FIG. 1 is a schematic diagram of a communications system wo according to an embodiment of this application. As shown in FIG. 1, a terminal device 130 accesses a wireless network to obtain a service of an external network (for example, the internet) by using the wireless network, or communicates with another terminal by using a wireless network. The wireless network includes a RAN 110 and a core network (CN) 120. The RAN 110 is configured to connect the terminal device 130 to the wireless network, and the CN 120 is configured to manage the terminal and provide a gateway for communicating with the external network.

It should be understood that a communication method provided in this application may be applicable to a wireless communications system, for example, the wireless communications system 100 shown in FIG. 1. There is a wireless communication connection between two communications apparatuses in the wireless communications system. One of the two communications apparatuses may correspond to the terminal device 130 shown in FIG. 1, for example, may be the terminal device 130 in FIG. 1, or may be a chip configured in the terminal device 130. The other communications apparatus in the two communications apparatuses may correspond to the RAN no shown in FIG. 1, for example, may be the RAN 110 in FIG. 1, or may be a chip configured in the RAN 110.

Without loss of generality, the following describes the embodiments of this application in detail by using an interaction process between a terminal device and a network device as an example. It may be understood that any terminal in the wireless communications system may communicate, based on a same method, with one or more network devices having a wireless communication connection. This is not limited in the embodiments of this application.

Figure 2:
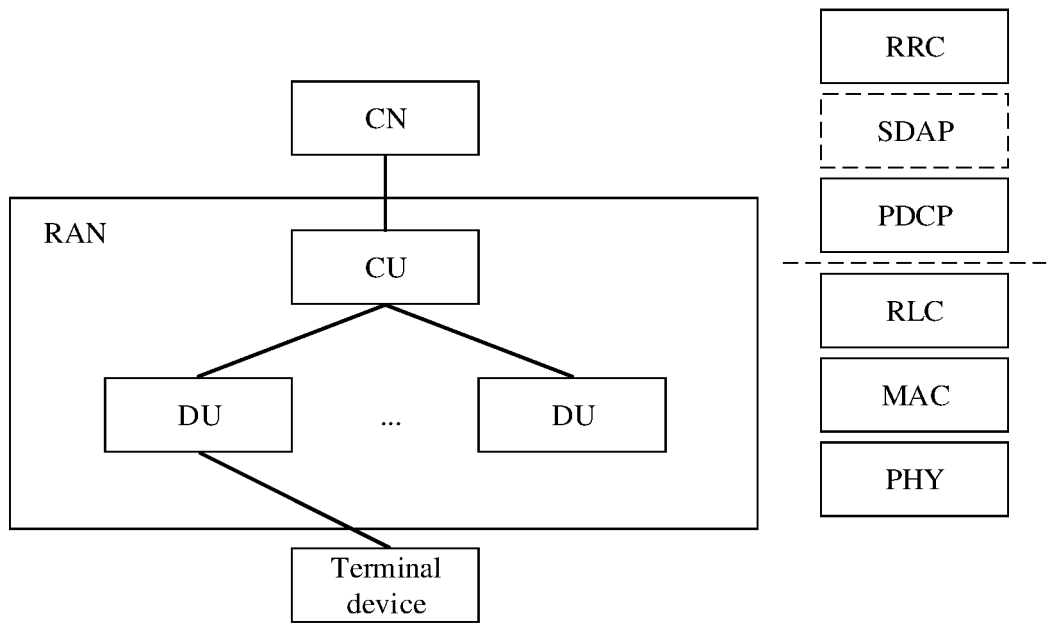
FIG. 2 is a schematic diagram of a network architecture according to an embodiment of this application.

FIG. 2 is a schematic diagram of a network architecture according to an embodiment of this application. As shown in FIG. 2, the network architecture includes a CN device and a RAN device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or some remote parts of the radio frequency apparatus are integrated into the baseband apparatus. For example, in an LTE communications system, a RAN device (eNB) includes a baseband apparatus and a radio frequency apparatus. The radio frequency apparatus may be remotely disposed relative to the baseband apparatus. For example, a remote radio unit (RRU) is remotely disposed relative to a baseband unit (BBU).

Communication between the RAN device and a terminal device complies with a specified protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may alternatively include functions of protocol layers such as a PDCP layer, an RLC layer, a MAC layer, and a physical layer. In an implementation, a service data adaptation (service data adaptation protocol, SDAP) layer is further included above the PDCP layer.

The functions of these protocol layers may be implemented by one node, or may be implemented by a plurality of nodes. For example, in an evolved structure, a RAN device may include a centralized unit (CU) and a distributed unit (DU), and a plurality of DUs may be centrally controlled by one CU. As shown in FIG. 2, the CU and the DU may be divided based on a protocol layer of a wireless network. For example, functions of the PDCP layer and a layer above the PDCP layer are set on the CU, and functions of protocol layers below the PDCP, such as the RLC layer and the MAC layer, are set on the DU.

The RAN device may implement functions of protocol layers such as a radio resource control (RRC) layer, a packet data convergence protocol (PDCP) layer, a radio link control (radio link control, RLC) layer, and a media access control (MAC) layer by using one or more nodes. For example, in an evolved structure, the RAN device may include a centralized unit (CU) and a distributed unit (DU), and a plurality of DUs may be centrally controlled by one CU. As shown in FIG. 2, the CU and the DU may be divided based on a protocol layer of a wireless network. For example, functions of the PDCP layer and a layer above the PDCP layer are set on the CU, and functions of protocol layers below the PDCP, such as the RLC layer and the MAC layer, are set on the DU.

Division based on the protocol layer is merely an example, and division may alternatively be performed based on another protocol layer, for example, the RLC layer. Functions of the RLC layer and a layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, division may alternatively be performed in another manner, for example, the division is performed based on latency. A function whose processing time needs to meet a latency requirement is set on the DU, and a function whose processing time does not need to meet the latency requirement is set on the CU.

In addition, the radio frequency apparatus may not be placed in the DU but is placed remotely from the DU, or may be integrated into the DU, or some remote parts of the radio frequency apparatus are integrated into the DU. This is not limited herein.

Figure 3:
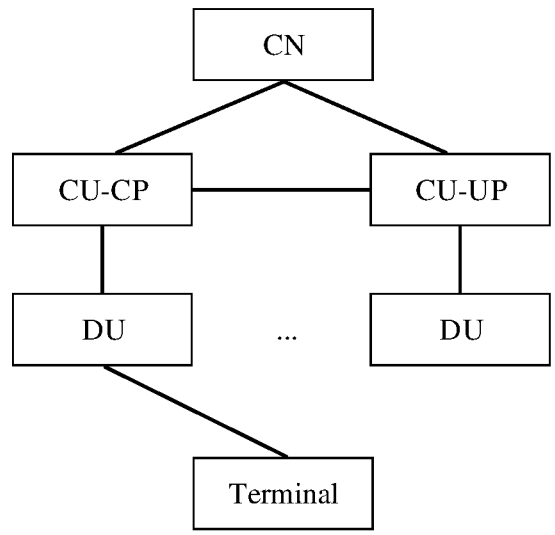
FIG. 3 is a schematic diagram of another network architecture according to an embodiment of this application.

FIG. 3 is a schematic diagram of another network architecture according to an embodiment of this application. Compared with the architecture shown in FIG. 2, a control plane (CP) and a user plane (UP) of a CU may be further separated into different entities for implementation, and the different entities are a control plane CU entity (CU-CP entity) and a user plane CU entity (CU-UP entity).

In the foregoing network architecture, signaling generated by the CU may be sent to a terminal device by using a DU or may be sent to the CU by using a DU. The DU may transparently transmit the signaling to the terminal device or the CU by directly encapsulating the signaling at a protocol layer without parsing the signaling. In the following embodiments, if transmission of such signaling between the DU and the terminal is involved, that the DU sends or receives the signaling includes this scenario. For example, signaling at an RRC layer or a PDCP layer is finally processed as signaling at a PHY layer and sent to the terminal device, or is converted from received signaling at a PHY layer. In this architecture, the signaling at the RRC layer or the PDCP layer may also be considered to be sent by the DU, or sent by the DU and a radio frequency.

In the foregoing embodiments, the CU is classified as a network device on a RAN side. In addition, the CU may alternatively be classified as a network device on a CN side. This is not limited herein.

In the following embodiments of this application, when the foregoing CU-DU structure is used, the network device may be a CU node, a DU node, or a RAN device including a CU node and a DU node.

Before the embodiments of this application are described, the following first briefly describes technical terms in the embodiments of this application.

1. LBT

To implement friendly coexistence with network devices, terminal devices, and inter-system wireless nodes such as Wi-Fi of different operators on an unlicensed spectrum, an LTE system operating on the unlicensed spectrum uses a listen-before-talk (LBT) channel access mechanism, and LBT is also referred to as channel listening. Before sending information, the network device or the terminal device needs to listen on a channel, and can occupy the channel to send the information, only after detecting that the channel is idle. That a sending node (including the network device or the terminal device) detects, before the sending node occupies a resource, that a channel is idle is referred to as successful LBT detection. That the sending node detects, after the sending node occupies a resource, that a channel is idle is referred to as failed LBT detection. After occupying the channel, a maximum time length for which the sending node can continuously send information is the maximum channel occupancy time (MCOT). When the channel is continuously occupied for the length, the channel needs to be released. The sending node can access the channel again only after LBT is performed again.

There may be a plurality of LBT detection types, and one of them is random backoff clear channel assessment (CCA). The random backoff CCA is also referred to as type 1 channel listening (Type 1 channel access). In the random backoff CCA, a sending device randomly generates a backoff counter, decreases the backoff counter by 1 when detecting that a channel is idle, and accesses the channel after completing backoff of the backoff counter. A specific procedure of the random backoff CCA is as follows The sending device evenly and randomly generates a backoff counter N between 0 and an initial contention window (CW), and performs channel listening by using a listening slot (CCA slot) (for example, duration is 9 μs) as a granularity. If it is detected that a channel is idle in the listening slot, the backoff counter N is decreased by 1. On the contrary, if it is detected that the channel is busy in the listening slot, the backoff counter is suspended, that is, the backoff counter N remains unchanged during the channel busy time, and the backoff counter is recounted only when it is detected that the channel is idle. When the backoff counter is reset to 0, it is considered that channel listening succeeds, and the sending device may immediately occupy the channel to send information. In addition, after the backoff counter is reset to 0, the sending device may alternatively wait for a period of time instead of immediately sending information. After the waiting ends, the sending device performs listening on an additional slot before a moment at which the information needs to be sent. If the sending device listens and detects, in the additional slot, that a channel is idle, it is considered that the channel listening succeeds or LBT succeeds, and the sending device may immediately send the information. If the backoff counter is not reset to 0 before a starting moment of the information, or the additional listening slot is busy, the channel listening fails or the LBT fails. The sending device includes a terminal device or a network device. After the network device successfully performs random backoff CCA, a corresponding MCOT is a DL MCOT. After the terminal device successfully performs random backoff CCA, a corresponding MCOT is a UL MCOT. The CW is also referred to as a CW size (CWS).

Another LBT type is single slot CCA. The single slot CCA is also referred to as Type 2 channel access, one shot (One shot) CCA, or 25 μs CCA. A procedure of the single slot CCA is as follows. A sending device performs single slot CCA listening with a fixed length of a listening slot (for example, the length of the listening slot is fixed to 25 μs). If it is detected that a channel is idle in the single slot, it is considered that channel listening or LBT succeeds, and the sending device may immediately access the channel. If it is detected that the channel is busy in the single slot, it is considered that channel listening or LBT fails, and the sending device gives up sending information, and may perform next single slot CCA listening before a next opportunity at which channel listening may be performed in the single slot to access the channel. [oils] There are two channel statuses: A channel is idle and a channel is busy. A criterion for determining a channel status is as follows. A wireless communications device (a base station device or a terminal device) compares a received power of a channel in a listening slot with an energy detection threshold (CCA-Energy Detection, CCA-ED). If the power is greater than the threshold, the status is that the channel is busy, or if the power is less than the threshold, the status is that channel is idle.

2. PUSCH Transmission of a Plurality of Subframes

Because uplink transmission on an unlicensed spectrum may continuously occupy a channel in an UL MCOT, scheduled PUSCH transmission of a terminal device is usually time-consecutive. In a conventional LTE system, each UL grant is used to schedule one subframe. If a network device needs to schedule one terminal device to occupy N subframes, the network device needs to send N UL grants. To schedule the terminal device to continuously occupy a plurality of subframes and avoid excessively high downlink control signaling overheads, multi-subframe scheduling is introduced into an LTE system operating on the unlicensed spectrum, to be specific, the network device may schedule, by using one UL grant (a corresponding physical downlink control channel (Physical Downlink Control Channel, PDCCH) format is a DCI format 0B or a DCI format 4B), one terminal device to occupy a plurality of consecutive subframes to send uplink information. Each of the plurality of subframes carries one PUSCH, or in other words, one physical uplink shared channel (PUSCH) is mapped to one corresponding subframe. A modulation and coding scheme, frequency domain resource allocation, pilot information, and the like that are indicated in the UL grant are applicable to each of the plurality of subframes.

3. PUSCH Transmission of Some Subframes

To enable a terminal device to have more channel access opportunities and improve channel use efficiency, transmission of some subframes is introduced into FeLAA. In a conventional LTE system operating in an unlicensed spectrum, a PUSCH scheduled by a network device is carried in a complete subframe (or carried in two slots included in a subframe). In comparison, in an FeLAA system, a PUSCH scheduled by a network device may be carried only on some time domain resources in a subframe, for example, is carried in one slot (slot) of the subframe and is not carried in another slot of the subframe. In other words, a data packet that the network device schedules the terminal device to send is mapped to only some time domain resources in a subframe. For example, the data packet is mapped to only one slot (slot) of a subframe and is not mapped to another slot of the subframe.

This application relates to three partial subframe transmission modes (Mode A, Mode B, and Mode C). The network device may indicate, by using a UL grant, the terminal device to use one or more of the three partial subframe transmission modes. When the network device schedules the terminal device to use a mode to send information in an uplink subframe, the uplink subframe is referred to as being applicable to the mode. The terminal device may use one of the three partial subframe transmission modes to send information in one subframe. When the terminal device uses a mode to send information in an uplink subframe, the uplink subframe is referred to as being applicable to the mode.

3.1. Mode A (Also Referred to as Mode 1, PUSCH Mode 1, or Partial PUSCH Mode 1)

Starting Moment

A subframe applicable to Mode A has at least two potential starting moments. A terminal device determines, based on a channel listening result, one of the potential starting moments to start to send uplink information. Specifically, a potential starting moment selected by the terminal device to actually start to send the uplink information depends on a starting moment at which the terminal device successfully performs channel listening.

For example, a subframe applicable to Mode A has two potential starting moments, and the first potential starting moment is located in the $1^{st}$ slot (slot #0).

Optionally, the potential starting moment that is of the subframe applicable to Mode A and that is located in the slot #0 may be specifically indicated by a UL grant.

Figure 4:
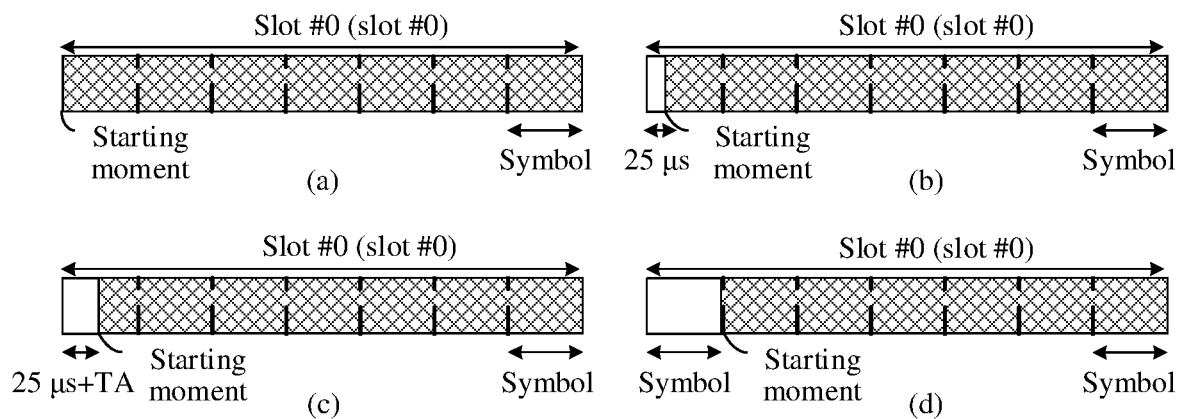
FIG. 4 is a schematic diagram showing that a subframe applicable to Mode A is located at a starting moment of a slot #0.

Specifically, the potential starting moment located in the slot #0 may be indicated by a "PUSCH starting position" bit field in the UL grant, and for example, may be (i) a starting boundary of the $1^{st}$ symbol (symbol #0) in the slot #0, for example, as shown in (a) in FIG. 4, or (2) a position that is 25 μs after a starting boundary of the $1^{st}$ symbol in the slot #0 (where the position is referred to as symbol #0+25 μs), for example, as shown in (b) in FIG. 4, or (3) a position that is 25 μs+TA (Timing Advance) after a starting boundary of the $1^{st}$ symbol in the slot #0 (where the position is referred to as symbol #0+25 μs+TA), for example, as shown in (c) in FIG. 4, where the TA is a timing advance that is indicated or configured by a network device for the terminal device to send the uplink information, or (4) a starting boundary of the $2^{nd}$ symbol (symbol #1) in the slot #0, for example, as shown in (d) in FIG. 4.

It should be understood that in the embodiments of this application, the potential starting moment located in the slot #0 is not limited to one of the foregoing four cases, and may be another starting moment located in the slot #0. This is not limited in this application.

Figure 5:
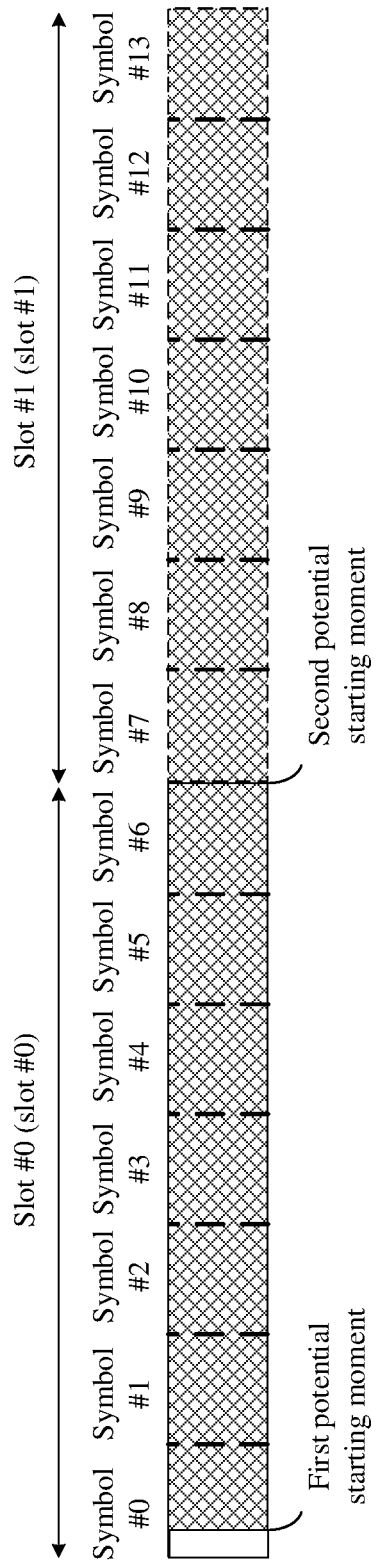
FIG. 5 is a schematic diagram showing that a subframe applicable to Mode A is located at a starting moment of a slot #1.

The second potential starting moment is located in the $2^{nd}$ slot (slot #1). Specifically, the second potential starting moment is a starting boundary of the $2^{nd}$ slot (slot #1), that is, a starting boundary of a symbol #7, for example, as shown in FIG. 5.

It should be understood that in the embodiments of this application, the potential starting moment located in the slot #1 is not limited to the starting boundary of the symbol #7, and may be another starting moment. This is not limited in this application.

For example, the subframe applicable to Mode A has two potential starting moments: the starting boundary of the $1^{st}$ symbol in the slot #0 of the subframe and the starting boundary of the $2^{nd}$ slot (slot #1) in the slot #0 of the subframe. When successfully performing channel listening before the starting boundary of the slot #0, the terminal device may start to send the uplink information from the starting boundary of the slot #0. If the terminal device fails to perform channel listening before the starting boundary of the slot #0, the terminal device may continue to perform channel listening before the starting boundary of the slot #1, and if the channel listening succeeds, the terminal device may start to send the uplink information from the starting boundary of the slot #1.

Ending Moment

For a subframe applicable to Mode A, an ending moment at which the terminal device sends information in the subframe is located in the $2^{nd}$ slot (slot #1) of the subframe, for example, may be an ending boundary of the last symbol (symbol #13) in the slot #1 or an ending boundary of the penultimate symbol (symbol #12) in the slot #1.

Optionally, the ending moment that is of the subframe applicable to Mode A and that is located in the slot #1 may be specifically indicated by a UL grant.

Specifically, a "PUSCH ending symbol" bit field in the UL grant may indicate whether the ending moment is located in the symbol #12 or the symbol #13.

It should be understood that, in the embodiments of this application, the ending moment at which the terminal device sends information in the subframe is not limited to the symbol #12 and the symbol #13 in the slot #1, and may be another ending moment located in the slot #1. This is not limited in this application.

Mapping Mode

For a subframe applicable to Mode A, although the terminal device may start sending from a slot #1 of the subframe, the terminal device maps a resource of a PUSCH in the subframe to two slots. In other words, the terminal device maps the PUSCH based on an assumption that sending may be performed in two slots. If channel listening fails at the potential starting moment of the slot #0 but succeeds at the potential starting moment of the slot #1, information in the slot #0 is discarded, and only information in the slot #1 is sent. In this case, because a part of useful information is discarded, transmission performance of this mode in the slot #1 is poorer than that of the transmission mode (for example, subsequent Mode B or Mode C) in which the PUSCH is mapped to only one slot during PUSCH mapping, because in the latter transmission mode, no useful information is discarded due to a channel listening failure.

Multi-Subframe Scheduling Status

When a network device indicates, by using a UL grant, a terminal device to send uplink information in at least one uplink subframe and the UL grant indicates that Mode A is used to send uplink information in a scheduled uplink subframe, Mode A is applicable to all uplink subframes (or each uplink subframe) scheduled by using the UL grant. In other words, each of the at least one uplink subframe has at least two potential starting moments, and a position of each of the two potential starting moments in the subframe is described above.

Figure 6:
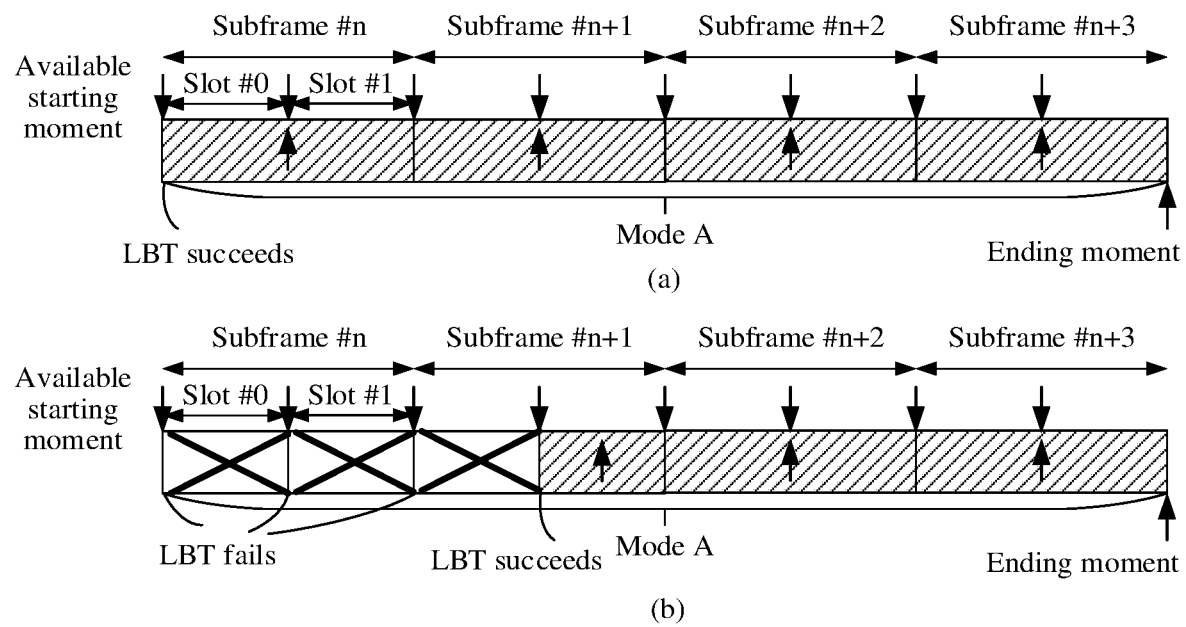
FIG. 6 is a schematic diagram of transmission manners corresponding to a plurality of subframes corresponding to Mode A.

For example, FIG. 6 shows transmission manners of a plurality of subframes corresponding to Mode A. When the UL grant schedules the terminal device to send subframes #n to #n+3 and indicates that Mode A is enabled, each subframe has two potential starting moments: a starting boundary of a symbol #0 (located in a slot #0) and a starting boundary of a symbol #7 (located in slot #1) Available starting moments in the subframes #n to #n+3 include a symbol #0 of the subframe #n, a symbol #7 of the subframe #n, a symbol #0 of the subframe #n+1, a symbol #7 of the subframe #n+1, . . . , a symbol #0 of the subframe #n+3, and a symbol #7 of the subframe #n+3, that is, the terminal device may sequentially perform channel listening before these available starting moments, and may continuously occupy a subsequent subframe to send information after successfully accessing a channel. As shown in (a) in FIG. 6, if the terminal device successfully performs channel listening before the symbol #0 of the subframe #n, the terminal device may start to occupy the channel from the symbol #0 of the subframe #n to send the subframes #n to #n+3. As shown in (b) in FIG. 6, if the terminal device fails to perform channel listening before the symbol #0 and symbol #7 of the subframe #n, and the symbol #0 of the subframe #n+1, and successfully performs channel listening before the symbol #7 of the subframe #n+1, the terminal device may start to occupy the channel from the symbol #7 of the subframe #n+1 to send the subframes #n+1 to #n+3. In addition, when the UL grant indicates Mode A, an ending moment of each of the subframes #n to #n+3 is located in the slot #1.

3.2. Mode B (Also Referred to as Mode 2, PUSCH Mode 2, or Partial PUSCH Mode 2)

Starting Moment and Ending Moment

For a subframe applicable to Mode B, a starting moment at which a terminal device sends information in the subframe is located in a slot #1 of the subframe. In other words, a network device schedules, by using a UL grant, the terminal device to occupy only the $2^{nd}$ slot of the subframe to send uplink information. In Mode B, the terminal device may occupy a time domain resource whose length is less than one subframe to send a PUSCH, so that channel use efficiency is improved.

Optionally, the starting moment that is of the subframe applicable to Mode B and that is located in the slot #1 may be specifically indicated by a UL grant.

Figure 7:
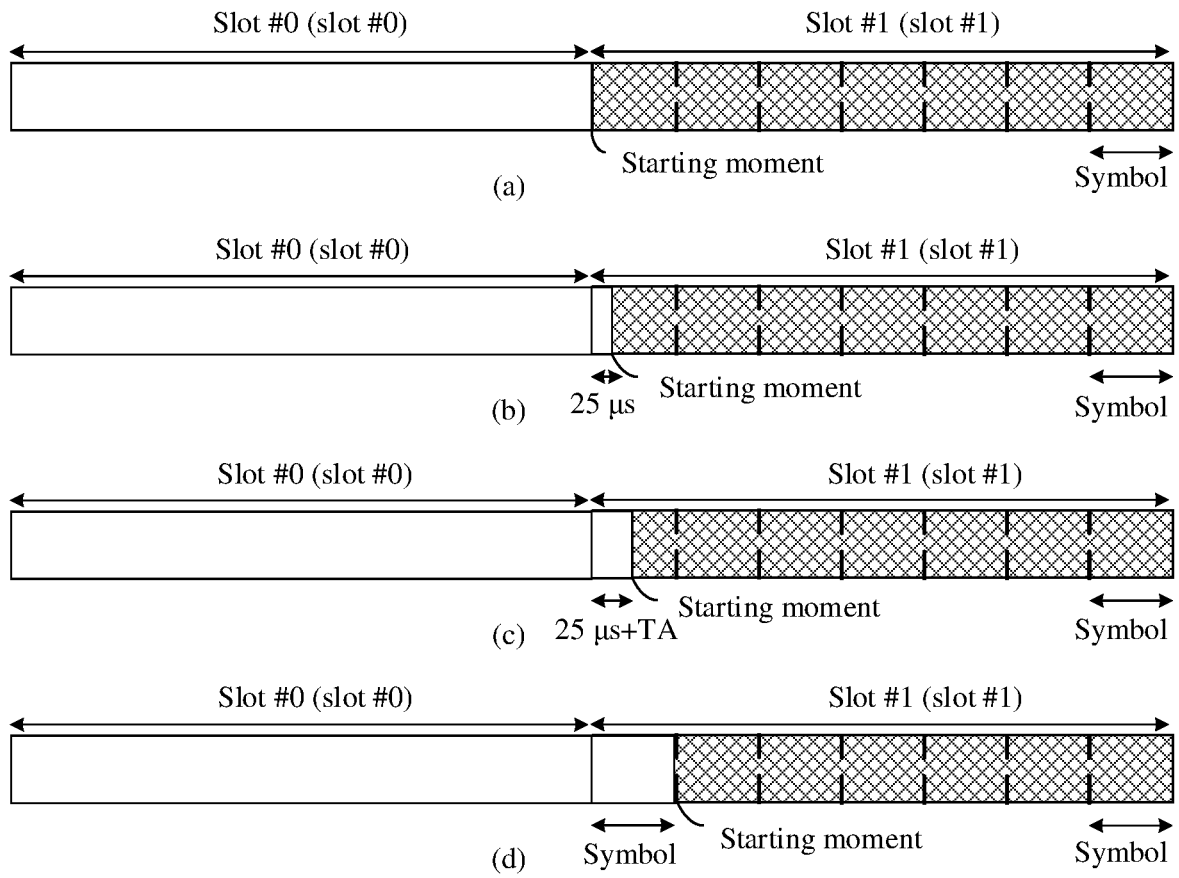
FIG. 7 is a schematic diagram showing that a subframe applicable to Mode B is located at a starting moment of a slot #1.

Specifically, the starting moment located in the slot #1 may be indicated by a "PUSCH starting position" bit field in the UL grant, and for example, may be (1) a starting boundary of the $1^{st}$ symbol (symbol #7) in the slot #1, for example, as shown in (a) in FIG. 7, or (2) a position that is 25 µs after a starting boundary of the $1^{st}$ symbol in the slot #1, for example, as shown in (b) in FIG. 7, or (3) a position that is 25 µs+TA after a starting boundary of the $1^{st}$ symbol in the slot #1, for example, as shown in (c) in FIG. 7, where the TA is a timing advance that is indicated or configured by a network device for the terminal device to send the uplink information, or (4) a starting boundary of the $2^{nd}$ symbol (symbol #8) in the slot #1, for example, as shown in (d) in FIG. 7.

It should be understood that in the embodiments of this application, the starting moment located in the slot #1 is not limited to one of the foregoing four cases, and may be another starting moment located in the slot #1. This is not limited in this application.

In addition, for a subframe applicable to Mode B, an ending moment at which the terminal device sends information in the subframe is located in the $2^{nd}$ slot of the subframe, for example, may be an ending boundary of the last symbol (symbol #13) in the slot #1 or an ending boundary of the penultimate symbol (the symbol #12) in the slot #1.

It should be understood that, in the embodiments of this application, the ending moment at which the terminal device sends information in the subframe is not limited to the symbol #12 and the symbol #13 in the slot #1, and may be another ending moment located in the slot #1. This is not limited in this application.

Specifically, a "PUSCH ending symbol" bit field in the UL grant may indicate whether the ending moment is located in the symbol #12 or the symbol #13.

Multi-Subframe Scheduling Status

When a network device indicates, by using a UL grant, a terminal device to send uplink information in at least one uplink subframe and the UL grant indicates that Mode B is used to send uplink information in a scheduled uplink subframe, Mode B is applicable to the $1^{st}$ uplink subframe in the at least one uplink subframe scheduled by using the UL grant. That is, only a starting moment of the $1^{st}$ subframe in the at least one uplink subframe is located in a slot #1 of the subframe, and starting moments of all subsequent subframes are located in a slot #0 of the subframe, specifically, a starting boundary of the $1^{st}$ symbol (symbol #0) in the slot #0, that is, the starting moment and a previous subframe are continuous in terms of time.

Figure 8:
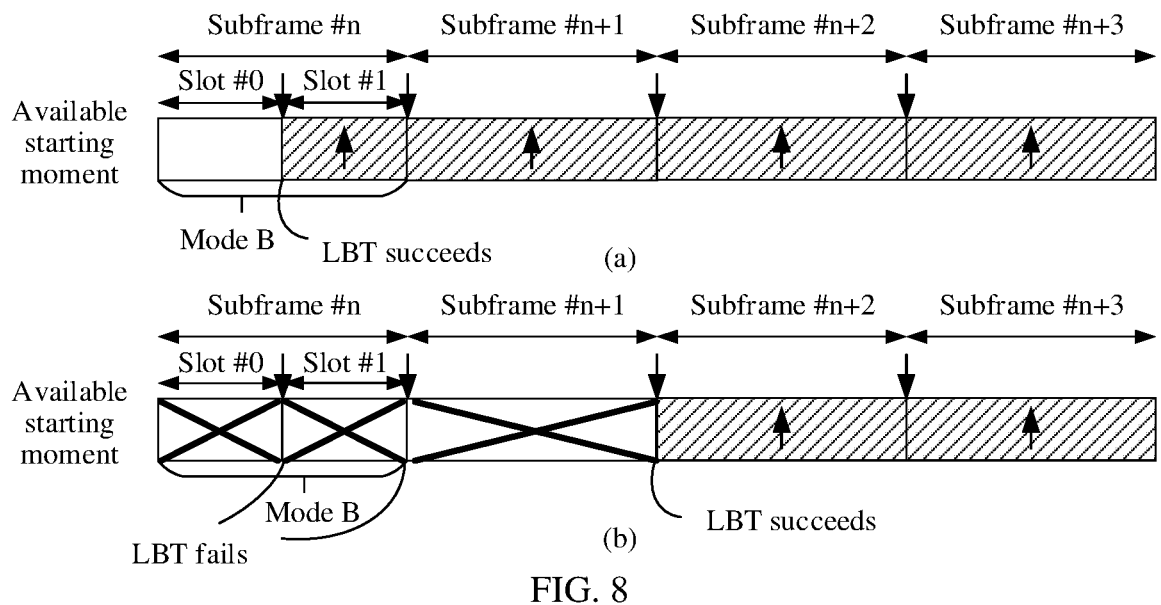
FIG. 8 is a schematic diagram of transmission manners corresponding to a plurality of subframes corresponding to Mode B.

For example, FIG. 8 shows transmission manners of a plurality of subframes corresponding to Mode B. When the UL grant schedules the terminal device to send subframes #n to #n+3 and indicates that Mode B is enabled, available starting moments in the subframes #n to #n+3 include a symbol #7 of the subframe #n, a symbol #0 of the subframe #n+1, a symbol #0 of the subframe #n+2, and a symbol #0 of the subframe #n+3. As shown in (a) in FIG. 8, if the terminal device successfully performs channel listening before the symbol #7 of the subframe #n, the terminal device may start to occupy a channel from the symbol #7 of the subframe #n to send the subframes #n to #n+3. As shown in (b) in FIG. 8, if the terminal device fails to perform channel listening before the symbol #7 of the subframe #n and the symbol #0 of the subframe #n+1, and successfully performs channel listening before the symbol #0 of the subframe #n+2, the terminal device may start to occupy a channel from the symbol #0 of the subframe #n+2 to send the subframes #n+2 to #n+3.

3.3. Mode C (Also Referred to as Mode 3, PUSCH Mode 3, or Partial PUSCH Mode 3)

Starting Moment and Ending Moment

For a subframe applicable to Mode C, an ending moment at which a terminal device sends information in the subframe is located in a slot #0 of the subframe. In other words, a network device schedules, by using a UL grant, the terminal device to occupy only the $1^{st}$ slot of the subframe to send uplink information. In Mode C, the terminal device may occupy a time domain resource whose length is less than one subframe to send a PUSCH, so that channel use efficiency is improved. A specific position of the ending moment that is of the subframe applicable to Mode C and that is located in the slot #0 may be indicated by the UL grant. For example, a "PUSCH ending symbol" bit field in the UL grant indicates that the ending moment is an ending boundary of the last symbol (symbol #6) in the slot #0 or an ending boundary of the $4^{th}$ symbol (symbol #3) in the slot #0.

It should be understood that, in the embodiments of this application, the ending moment at which the terminal device sends information in the subframe is not limited to the symbol #3 and the symbol #6 in the slot #0, and may be another ending moment located in the slot #0. This is not limited in this application.

Optionally, for a subframe applicable to Mode C, a starting moment at which the terminal device sends information in the subframe is located in the $1^{st}$ slot (slot #0) of the subframe. A specific starting moment may be indicated by the UL grant.

Specifically, the starting moment located in the slot #0 may be indicated by a "PUSCH starting position" bit field in the UL grant. For example, the starting moment is located at the starting boundary of the $1^{st}$ symbol (symbol #0) in the slot #0, a position that is 25 µs after a starting boundary of the $1^{st}$ symbol in the slot #0, a position that is 25 µs+TA after a starting boundary of the $1^{st}$ symbol in the slot #0, or a starting boundary of the $2^{nd}$ symbol (symbol #1) of the slot #0. The starting moment and this indication method are respectively similar to the potential starting moment that is of the subframe applicable to Mode A and that is located in the slot #0 and the indication method of the potential starting moment, as shown in (a) to (d) in FIG. 4.

It should be understood that in the embodiments of this application, the starting moment located in the slot #0 is not limited to one of the foregoing four cases, and may be another starting moment located in the slot #0. This is not limited in this application.

Multi-Subframe Scheduling Status

When a network device indicates, by using a UL grant, a terminal device to send uplink information in at least one uplink subframe and the UL grant indicates that Mode C is used to send uplink information in a scheduled uplink subframe, Mode C is applicable to the last uplink subframe in the at least one uplink subframe scheduled by using the UL grant. That is, only an ending moment of the last subframe in the at least one uplink subframe is located in a slot #0 of the subframe, and ending moments of all previous subframes are located in a slot #1 of the subframe, specifically, an ending boundary of the last symbol (symbol #13) in the slot #1, that is, the ending moment and a subsequent subframe are continuous in terms of time.

Figure 9:
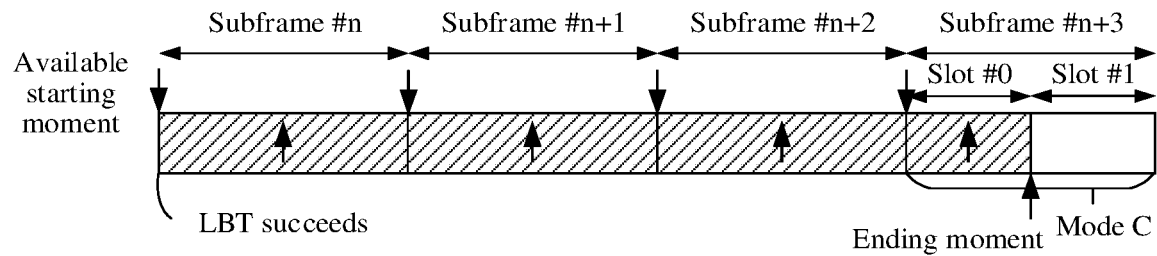
FIG. 9 is a schematic diagram of transmission manners corresponding to a plurality of subframes corresponding to Mode C.

For example, FIG. 9 shows transmission manners of a plurality of subframes corresponding to Mode C. When the UL grant schedules the terminal device to send subframes #n to #n+3 and indicates Mode C, ending moments in the subframes #n to #n+3 include a symbol #13 of the subframe #n, a symbol #13 of the subframe #n+1, a symbol #13 of the subframe #n+2, and a symbol #6 of the subframe #n+3.

In an existing UL grant used for multi-subframe scheduling, each of the foregoing three modes correspondingly has an independent bit field (1 bit) used to indicate whether to enable the mode. Considering that the network device may configure or indicate the terminal device to use (or enable or open) at least two of the foregoing three transmission modes for transmission, a conflict occurs when Mode A and Mode B are simultaneously enabled, Mode A and Mode C are simultaneously enabled, Mode A and Mode C are simultaneously enabled, or Mode A, Mode B, and Mode C are simultaneously enabled.

Figure 10:
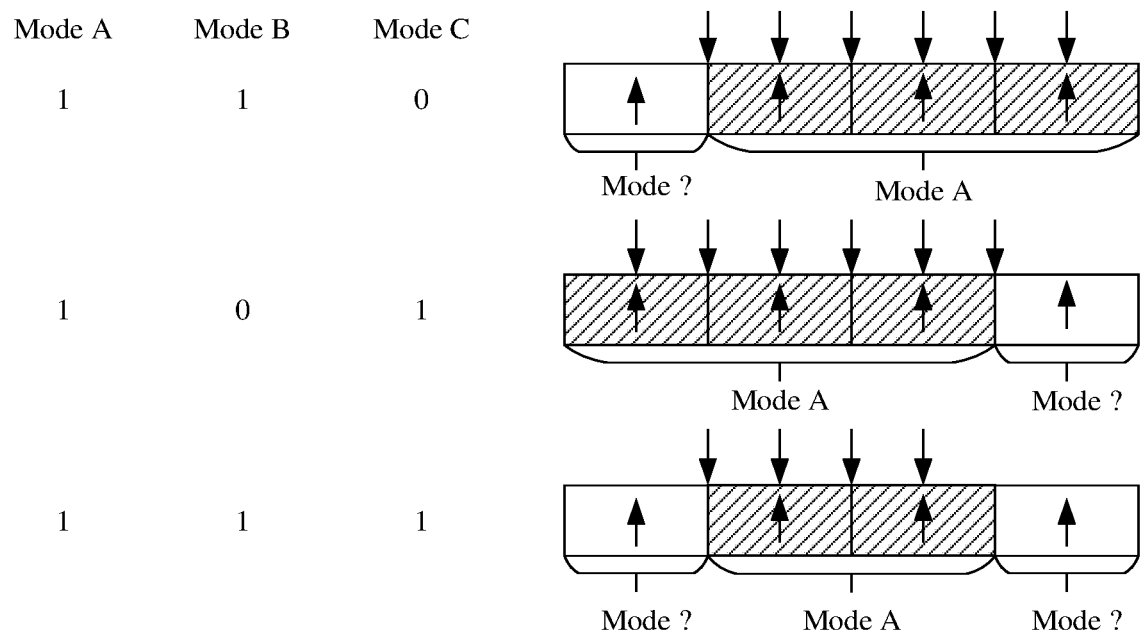
FIG. 10 is a schematic diagram of transmission manners used when one or more transmission modes are enabled.

In an existing conclusion, when the UL grant schedules at least one uplink subframe, Mode A is applicable to each of the at least one uplink subframe, and Mode B is applicable to the $1^{st}$ uplink subframe in the at least one uplink subframe. Therefore, if both Mode A and Mode B allow to be enabled at the same time, for example, in the UL grant, a bit field (for example, the bit field of Mode A is "1") corresponding to Mode A indicates that Mode A is enabled and a bit field (for example, the bit field of Mode B is "1") corresponding to Mode B indicates that Mode B is enabled, because starting moments of the first uplink subframe defined in the two modes conflict with each other, whether the terminal device should comply with Mode A (whether the terminal device starts to send information in the slot #0 or the slot #1 based on a channel listening result) or Mode B (the terminal device starts to send information in the slot #1) needs to be defined. For example, in FIG. 10, when Mode A-Mode B-Mode C is set to "1"–"1"–"0" or "1"–"1"–"1", which mode should be complied with by the terminal device needs to be determined.

Similarly, when the UL grant schedules at least one uplink subframe, Mode C is applicable to the last uplink subframe in the at least one uplink subframe. If both Mode A and Mode C allow to be enabled at the same time, for example, in the UL grant, a bit field (for example, the bit field of Mode A is "1") corresponding to Mode A indicates that Mode A is enabled, and a bit field (for example, the bit field of Mode C is "1") corresponding to Mode C indicates that Mode C is enabled, because starting moments of the last uplink subframe defined in the two modes conflict with each other, whether the terminal device should comply with Mode A (the ending moment is located in the slot #1) or Mode C (the ending moment is located in the slot #0) needs to be defined. For example, in FIG. 10, when Mode A-Mode B-Mode C is set to "1"–"0"–"1" or "1"–"1"–"1", which mode should be complied with by the terminal device needs to be determined.

To resolve this conflict problem, in the prior art, the network device does not indicate, in a same UL grant, the terminal device to enable both Mode A and Mode B (or Mode A and Mode C).

For example, when Mode A is enabled in the UL grant, Mode B (or Mode C) does not allow to be enabled at the same time.

For another example, when Mode B (or Mode C) is enabled in the UL grant, Mode A does not allow to be enabled at the same time.

Because Mode A and Mode B (or Mode A and Mode C) do not allow to be enabled at the same time, indication flexibility of transmission modes of some subframes is relatively low.

For example, when the network device needs to indicate the $1^{st}$ subframe in a plurality of subframes scheduled by the UL grant as corresponding to Mode B, the network device cannot indicate the remaining subframes in the plurality of subframes as corresponding to Mode A at the same time. A subframe in Mode A has two potential starting moments. In this case, if the remaining subframes are not allowed to use Mode A, and the terminal device fails to perform channel listening in the $1^{st}$ subframe to access a channel, each of the remaining subframes has only one access opportunity. Therefore, compared with a case in which Mode A (where each subframe has two access opportunities) is used, a channel access opportunity is lost, thereby affecting channel use efficiency.

For another example, when the network device needs to indicate all subframes in the plurality of subframes scheduled by the UL grant as corresponding to Mode A, the network device cannot indicate the $1^{st}$ subframe in the plurality of subframes as corresponding to Mode B at the same time. In some cases, the network device does not expect the terminal device to occupy the slot #0 in the $1^{st}$ subframe to send information. For example, the network device may occupy the slot #0 in the $1^{st}$ subframe to send downlink information, and in this case, if the terminal device also occupies the slot #0 in the $1^{st}$ subframe at the same time to send information, interference may be caused. If the network device wants to indicate the $1^{st}$ subframe to use Mode B and a subsequent subframe to use Mode A, the network device needs to send a plurality of UL grants to separately indicate the two modes. However, this increases control signaling overheads.

For still another example, when the network device needs to indicate the last subframe in a plurality of subframes scheduled by the UL grant as corresponding to Mode C, the network device cannot indicate the remaining previous subframes in the plurality of subframes as corresponding to Mode A at the same time. Compared with a case in which other previous subframes are indicated as corresponding to Mode A (where each subframe has two access opportunities), the remaining previous subframes in this case lose a channel access opportunity, thereby affecting channel use efficiency.

For still another example, when the network device needs to indicate all subframes in the at least one subframe scheduled by the UL grant as corresponding to Mode A, the network device cannot indicate the last subframe in all the subframes as corresponding to Mode C at the same time. In this case, interference may be caused. If the network device wants to indicate the last subframe to use Mode C and remaining previous subframes to use Mode A, the network device needs to send a plurality of UL grants to separately indicate the two modes. However, this increases control signaling overheads.

According to the communication method provided in this embodiment of this application, in a scenario in which at least one subframe is scheduled, the network device is allowed to indicate a plurality of transmission modes in the scheduling information, and a behavior of the terminal device for a plurality of subframes whose transmission modes conflict with each other is defined. This helps improve indication flexibility.

In the embodiments of this application, an uplink subframe (for example, any of the at least one uplink subframe, a first uplink subframe, a second uplink subframe, or a third uplink subframe) may be a time unit or a slot. In the embodiments of this application, a time unit is one or more consecutive transmission time intervals (TTI), one or more consecutive slots, or one or more consecutive time domain symbols.

Optionally, the time unit may be a subframe, a slot, or a TTI. The slot may be a 1 ms slot, or is referred to as a subframe whose length is 1 ms. The slot may alternatively be shorter than 1 ms. The slot may correspond to 14 time domain symbols, or may correspond to fewer than 14 time domain symbols. When the slot includes fewer than 14 time domain symbols, the slot corresponds to a short transmission time interval (short TTI, sTTI). In this case, the slot is referred to as a mini-slot (mini-slot), a non-slot (non-slot), or a sub-slot (sub-slot).

For uplink transmission, a subframe (or a slot or a TTI) is a time domain granularity for uplink resource allocation or uplink transmission, or in other words, a subframe (or a slot or a TTI) is a minimum time domain unit in which the terminal device performs uplink transmission or sends an uplink data packet or an information packet. An optional length that may be supported by an uplink mini-slot includes structures such as seven uplink symbols, one uplink symbol, two uplink symbols, three uplink symbols, and four uplink symbols, where the uplink symbol may be a single carrier frequency division multiple access symbol (SC-FDMA symbol) or an orthogonal frequency division multiple access symbol (OFDMA symbol).

For downlink transmission, a subframe (or a slot or a TTI) is a time domain granularity for downlink resource allocation or downlink transmission, in other words, a subframe (or a slot or a TTI) is a minimum time domain unit in which the network device performs downlink transmission or sends a downlink data packet. An optional length that may be supported by a downlink mini-slot includes structures such as seven downlink symbols, one downlink symbol, two downlink symbols, three downlink symbols, and four downlink symbols, where the downlink symbol may be an OFDMA symbol. The uplink mini-slot or the downlink mini-slot also supports another TTI length shorter than 1 ms.

It should be understood that one uplink subframe may include M time domain symbols, and M is a positive integer. For example, M=14. The $1^{st}$ time domain symbol may be referred to as a symbol #0, the last symbol may be referred to as a symbol #M−1, and sequential numbers in the middle are accumulated in sequence. For example, a kth time domain symbol is referred to as a symbol #k−1, and k is greater than or equal to 1 and less than or equal to M.

It should be further understood that one uplink subframe may include two slots, and each slot includes at least one consecutive time domain symbol. Specifically, the two slots do not overlap in terms of time. Further, the two slots form the uplink subframe in terms of time. For example, M=14. The $1^{st}$ slot (which may be referred to as a slot #0) of the uplink subframe includes a symbol #0 to a symbol #x, and the $2^{nd}$ slot (which may be referred to as a slot #1) includes a symbol #x to a symbol #13, where x is an integer, and x is greater than 0 and less than 13. For example, x=6, that is, the slot #0 includes a symbol #0 to a symbol #6, and the slot #1 includes a symbol #7 to a symbol #13.

It should be further understood that the slot in the embodiments of this application may also be referred to as a time domain resource. For example, the $1^{st}$ slot (an earlier slot) in the two slots is referred to as a first time domain resource, and the $2^{nd}$ slot (a later slot) in the two slots is referred to as a second time domain resource. The first time domain resource includes at least one uplink symbol in the uplink subframe, and the second time domain resource includes at least one other uplink symbol that does not overlap in terms of time in the uplink subframe. For example, for a 5G NR system, a time unit for transmitting a data packet is referred to as a slot. In this case, the slot corresponds to one subframe (for example, any of at least one subframe, a first subframe, a second subframe, or a third subframe) in the embodiments of this application. The slot includes a first time domain resource and a second time domain resource, where the first time domain resource corresponds to the $1^{st}$ slot (slot #0) of the subframe in the embodiments of this application, and the second time domain resource corresponds to the $2^{nd}$ slot (slot #1) of the subframe in the embodiments of this application.

Figure 11:
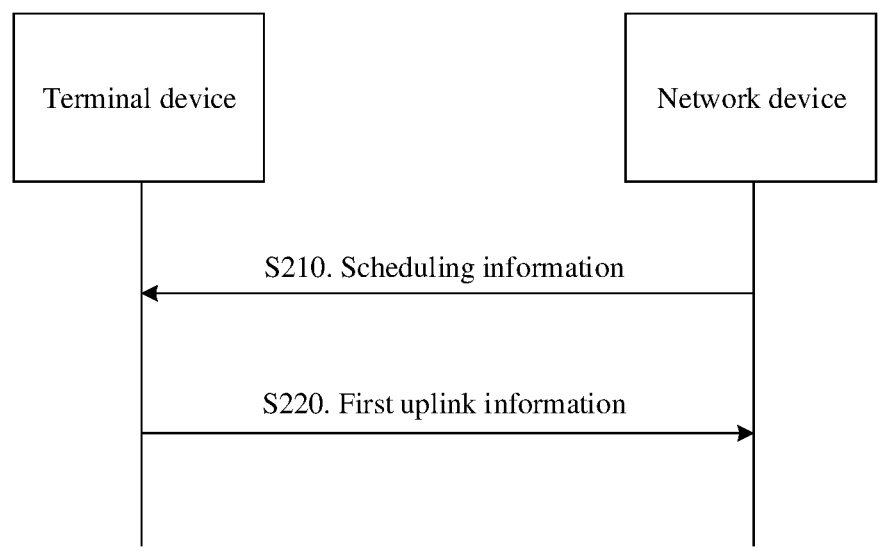
FIG. 11 is a schematic flowchart of a communication method according to an embodiment of this application.

FIG. 11 is a schematic flowchart of a communication method 200 according to an embodiment of this application. As shown in FIG. 11, the method 200 includes the following steps.

S210. A network device sends scheduling information to a terminal device, and the terminal device receives the scheduling information from the network device, where the scheduling information is used to indicate at least one uplink subframe, the scheduling information includes a first indication field and a second indication field, the first indication field is used to indicate whether each of the at least one uplink subframe is applicable to a first mode, the second indication field is used to indicate whether a first uplink subframe is applicable to a second mode, and the at least one uplink subframe includes the first uplink subframe.

Optionally, the first mode is Mode A.

Optionally, the second mode is Mode B or Mode C.

Optionally, the first mode or the second mode (or a third mode below) is a transmission mode of an uplink subframe or an uplink channel (an uplink traffic channel, an uplink control channel, or an uplink random access channel), for example, a multi-antenna transmission mode, a reference signal transmission mode, a modulation scheme, and a coding scheme, a transmission manner of control information, a mapping manner of control information to a traffic channel, a time domain resource use mode, a frequency domain resource use mode, or the like. For a plurality of subframes (that is, the at least one uplink subframe) that the network device schedules the terminal device to send, transmission modes applicable to all of the plurality of subframes may be referred to as the first mode, transmission modes applicable to a specific subframe in the plurality of subframes, for example, the first uplink subframe, may be referred to as the second mode, and transmission modes applicable to another specific subframe in the plurality of subframes, for example, a third uplink subframe, may be referred to as the third mode. Specifically, the specific subframe may be the $1^{st}$ subframe, the $2^{nd}$ subframe, the penultimate subframe, or the last subframe in the plurality of subframes.

It should be understood that the network device may schedule any of the at least one uplink subframe for the terminal device to send uplink information. The uplink subframe may be used to carry only the uplink information, or may be used to carry both the uplink information and downlink information. For example, the network device sends the downlink information on some time domain resources of the uplink subframe, and the terminal device sends the uplink information on other time domain resources of the uplink subframe.

It should be understood that the scheduling information may also be referred to as indication information.

Optionally, the scheduling information is downlink control information (DCI) used to schedule the terminal device to send uplink information. For example, the scheduling information is an uplink grant UL grant.

Optionally, the scheduling information is carried in physical layer downlink control signaling. For example, the physical layer downlink control signaling is DCI. For example, the DCI may be an uplink grant UL grant. Further, the scheduling information is at least one field in the DCI or the UL grant.

It should be understood that both the first indication field and the second indication field belong to same DCI or a same UL grant, to be specific, the scheduling information or the DCI or the UL grant in which the scheduling information is located, instead of belonging to two different pieces of DCI or two different UL grants. To reduce overheads, the first indication field and the second indication field may be carried in one piece of control signaling, or in other words, may be carried in only one piece of control signaling, and are respectively used to indicate the first mode and the second mode.

Similarly, a third indication field below, the first indication field, and the second indication field all belong to the same DCI or the same UL grant.

It should be understood that the indication field (the first indication field, the second indication field, or the third indication field) in this embodiment is specifically a bit field (referred to as a bit field or a field) in the scheduling information.

For example, the first indication field is a "PUSCH Mode 1" field or a "Partial PUSCH Mode 1" field in the DCI.

For another example, the second indication field is a "PUSCH Mode 2" field or a "Partial PUSCH Mode 2" field in the DCI, or a "PUSCH Mode 3" field or a "Partial PUSCH Mode 3" field in the DCI.

For still another example, the third indication field is a "PUSCH Mode 3" field or a "Partial PUSCH Mode 3" field in the DCI.

As should be understood, that the scheduling information is used to indicate at least one uplink subframe is also referred to as that the scheduling information is used to schedule the terminal device to send uplink information in the at least one uplink subframe. Further, the at least one uplink subframe is all uplink subframes scheduled by using the scheduling information.

As should be further understood, that the first indication field is used to indicate whether each of the at least one uplink subframe is applicable to the first mode may also be referred to as that the first indication field is used to indicate whether the at least one uplink subframe is applicable to the first mode, that the first indication field is used to indicate whether to use the first mode to send information in the at least one uplink subframe, that the first indication field is used to indicate whether each of the at least one uplink subframe corresponds to the first mode, or that the first indication field is used to indicate whether the terminal device enables the first mode. The first mode is applicable to each of the at least one uplink subframe.

As should be further understood, that the first indication field is used to indicate whether each of the at least one uplink subframe is applicable to the first mode includes when the first indication field indicates that each of the at least one uplink subframe is applicable to the first mode and another indication field (for example, the second indication field or the third indication field below) in the scheduling information indicates that a subframe (for example, the second uplink subframe or the third uplink subframe below) in the at least one uplink subframe is not applicable to another mode (for example, the second mode or the third mode below), the terminal device sends uplink information in any of the at least one uplink subframe by using the first mode. However, when the first indication field indicates that each of the at least one uplink subframe is applicable to the first mode and the another indication field indicates that the subframe in the at least one uplink subframe is applicable to the another mode, not each of the at least one uplink subframe is actually applicable to the first mode. In other words, the terminal device does not use the first mode to send uplink information in any of the at least one uplink subframe.

Similarly, that the second indication field is used to indicate whether the first uplink subframe is applicable to the second mode may also be referred to as that the second indication field is used to indicate whether to use the second mode to send information in the first uplink subframe, that the second indication field is used to indicate whether the first uplink subframe corresponds to the second mode, or that the second indication field is used to indicate whether the terminal device enables the second mode. The second mode is applicable to the first uplink subframe.

Similarly, that the third indication field is used to indicate whether the third uplink subframe is applicable to the third mode below may also be referred to as that the third indication field is used to indicate whether to use the third mode to send information in the third uplink subframe, that the third indication field is used to indicate whether the third uplink subframe corresponds to the third mode, or that the third indication field is used to indicate whether the terminal device enables the third mode. The third mode is applicable to the third uplink subframe.

For any mode (for example, the first mode, the second mode, or the third mode, for another example, Mode A, Mode B, or Mode C) in the embodiments of this application, that the mode is not enabled may also be referred to as that the mode is disabled, that the mode is not used to send information in a corresponding uplink subframe, or that the terminal device does not use the mode to send uplink information in any of the at least one uplink subframe.

Optionally, the network device may indicate or configure the terminal device to use the first mode and/or the second mode.

Optionally, the network device indicates, by using the first indication field in the scheduling information, whether each of the at least one uplink subframe is applicable to the first mode. In this case, it may be considered that the first mode indicated by the scheduling information is applicable to each of the at least one uplink subframe.

Specifically, for example, the first mode is Mode A. When the network device indicates, by using the scheduling information, the terminal device to send a PUSCH by using Mode A, Mode A is applicable to all uplink subframes scheduled by using the scheduling information. For example, when the scheduling information is used to schedule the terminal device to send four subframes: a subframe #n to a subframe #n+3, the terminal device may sequentially perform channel listening before a slot #0 of the subframe #n, a slot #1 of the subframe #n, a slot #0 of the subframe #n+1, a slot #1 of the subframe #n+1, a slot #0 of the subframe #n+2, a slot #1 of the subframe #n+2, a slot #0 of the subframe #n+3, and a slot #1 of the subframe #n+3, and after successfully accessing a channel, may continuously occupy a subsequent subframe and slot to send information.

Optionally, the network device configures, by using higher layer signaling (for example, RRC signaling), whether each of at least one uplink subframe to be sent by the terminal device or each of at least one scheduled uplink subframe uses the first mode. In this case, it may be considered that the first mode configured by the network device is applicable to each of the at least one uplink subframe. That is, the terminal device receives the scheduling information sent by the network device. The scheduling information is used to schedule the terminal device to send the uplink information in the at least one uplink subframe. The scheduling information includes the second indication field. The second indication field is used to indicate whether the first uplink subframe in the at least one uplink subframe is applicable to the second mode. The network device configures whether each of the at least one uplink subframe is applicable to the first mode.

It should be understood that the network device schedules, by using the DCI or the UL grant, the terminal device to occupy the at least one uplink subframe to send the uplink information. Specifically, the UL grant may include at least one type of scheduling information such as a frequency domain resource and a time domain resource that are occupied by the uplink information, a modulation and coding scheme (MCS), demodulation reference signal (DMRS) sequence information corresponding to a physical channel carrying the uplink information, and a channel listening type.

It should be understood that the uplink information may be uplink data information or uplink control information, or may include both uplink data information and uplink control information.

Optionally, the at least one uplink subframe is at least two uplink subframes.

A plurality of simultaneously enabled transmission modes conflict with each other for a specific subframe, only in a multi-subframe scheduling scenario in which some transmission modes are applicable to all subframes in the at least two uplink subframes and some modes are applicable to the specific subframe (for example, the 1$^{st}$ subframe or the last subframe) in the at least two uplink subframes. Therefore, the scheduling information in this application is information for scheduling at least two uplink subframes. Specifically, the scheduling information is downlink control information (DCI) or a UL grant, and corresponds to a control information format DCI format 0B or a DCI format 4B. Alternatively, the DCI or the UL grant in which the scheduling information is located corresponds to a control information format DCI format 0B or a DCI format 4B.

As should be understood, that the first mode is applicable to each of the at least one uplink subframe may also be referred to as that the first mode is applicable to the at least one uplink subframe, that the first mode is applicable to all uplink subframes in the at least one uplink subframe, or that the first mode is applicable to any of the at least one uplink subframe.

It should be further understood that the terminal device in the method 200 may alternatively be a chip or an apparatus used for the terminal device, and the network device may alternatively be a chip or an apparatus used for the network device.

S220. When the first indication field indicates that each of the at least one uplink subframe is applicable to the first mode and the second indication field indicates that the first uplink subframe is applicable to the second mode, the terminal device sends first uplink information in the first uplink subframe by using the second mode.

Specifically, because the first mode is applicable to each of the at least one uplink subframe, and the second mode is applicable to a specific uplink subframe in the at least one uplink subframe, that is, the first uplink subframe, if the network device wants the terminal device to use the second mode to send information in the first uplink subframe in the at least one uplink subframe, and use the first mode to send information in another uplink subframe in the at least one uplink subframe, the scheduling information may be enabled to indicate that both the first mode and the second mode are enabled.

In this case, the scheduling information received by the terminal device indicates that both the first mode and the second mode are enabled, and the terminal device sends the first uplink information in the first uplink subframe by using the second mode. In other words, because both the first mode and the second mode are applicable to the first uplink subframe, when both the first mode and the second mode are enabled, for the first uplink subframe, to avoid a conflict, the second mode overrides the first mode.

As should be understood, that the first indication field indicates that each of the at least one uplink subframe is applicable to the first mode is also referred to as that the first indication field indicates to enable the first mode, or that the first indication field indicates that the at least one uplink subframe is applicable to the first mode.

As should be understood, that the second indication field indicates that the first uplink subframe is applicable to the second mode is also referred to as that the second indication field indicates to enable the second mode.

As should be understood, that the third indication field indicates that the third uplink subframe is applicable to the third mode below is also referred to as that the third indication field indicates to enable the third mode.

As should be understood, enabling the first mode (for example, Mode A) means that the scheduling information indicates that the terminal device uses the first mode in the at least one uplink subframe scheduled by using the scheduling information or indicates to the terminal device that the first mode is used for the at least one uplink subframe scheduled by using the scheduling information. In other words, in the scheduling information, a status of a bit field used to indicate the first mode is an on ("on") state. For example, a value of the bit field is "1". Not enabling the first mode means that the scheduling information indicates that the terminal device does not correspond to the at least one uplink subframe scheduled by using the scheduling information or does not use the first mode in the at least one uplink subframe scheduled by using the scheduling information. In other words, in the scheduling information, a status of a bit field used to indicate the first mode is an off ("off") state. For example, a value of the bit field is "o".

As should be further understood, enabling the second mode (for example, Mode B or Mode C) means that the scheduling information indicates that the terminal device uses the second mode in the first uplink subframe in the at least one uplink subframe scheduled by using the scheduling information or indicates to the terminal device that the second mode is used for the first uplink subframe in the at least one uplink subframe scheduled by using the scheduling information. In other words, in the scheduling information, a status of a bit field used to indicate the second mode is an on ("on") state. For example, a value of the bit field is "1". Not enabling the second mode means that the scheduling information indicates that the terminal device does not correspond to the first uplink subframe in the at least one uplink subframe scheduled by using the scheduling information or does not use the second mode in the first uplink subframe in the at least one uplink subframe scheduled by using the scheduling information. In other words, in the scheduling information, a status of a bit field used to indicate the second mode is an off ("off") state. For example, a value of the bit field is "o".

As should be further understood, enabling the third mode (for example, Mode C) means that the scheduling information indicates that the terminal device uses the third mode in the third uplink subframe in the at least one uplink subframe scheduled by using the scheduling information or indicates to the terminal device that the third mode is used for the third uplink subframe in the at least one uplink subframe scheduled by using the scheduling information. In other words, in the scheduling information, a status of a bit field used to indicate the third mode is an on ("on") state. For example, a value of the bit field is "1". Not enabling the third mode means that the scheduling information indicates that the terminal device does not correspond to the third uplink subframe in the at least one uplink subframe scheduled by using the scheduling information or does not use the third mode in the third uplink subframe in the at least one uplink subframe scheduled by using the scheduling information. In other words, in the scheduling information, a status of a bit field used to indicate the third mode is an off ("off") state. For example, a value of the bit field is "0".

As should be further understood, that the terminal device sends the first uplink information in the first uplink subframe by using the second mode may also be referred to as that the terminal device sends the first uplink subframe by using the second mode.

Similarly, in the following description, that the terminal device sends corresponding uplink information (the first uplink information to sixth uplink information) in a corresponding uplink subframe (the first uplink subframe, the second uplink subframe, the third uplink subframe, or any of the at least one uplink subframe) by using any mode (for example, the first mode, the second mode, or the third mode, and for another example, Mode A, Mode B, or Mode C) may also be referred to as that the terminal device sends the corresponding uplink subframe by using the mode.

According to the communication method in this embodiment of this application, the network device is allowed to indicate a plurality of transmission modes of an uplink subframe in the scheduling information, and a behavior of the terminal device for a plurality of subframes whose transmission modes conflict with each other is defined. This helps improve indication flexibility of a transmission mode of an uplink subframe.

For example, compared with the prior art, when indicating the $1^{st}$ subframe in a plurality of subframes scheduled by a UL grant as corresponding to Mode B, the network device may indicate a subframe other than the $1^{st}$ subframe in the plurality of subframes as corresponding to Mode A, thereby avoiding a loss of a channel access opportunity, and helping improve channel use efficiency.

For another example, when indicating each of a plurality of subframes scheduled by a UL grant as corresponding to Mode A, the network device may indicate the $1^{st}$ subframe in the plurality of subframes as corresponding to Mode B, thereby helping reduce control signaling overheads while ensuring indication flexibility.

For still another example, when indicating the last subframe in a plurality of subframes scheduled by a UL grant as corresponding to Mode C, the network device may indicate a subframe other than the last subframe in the plurality of subframes as corresponding to Mode A, thereby avoiding a loss of a channel access opportunity, and helping improve channel use efficiency.

For still another example, when indicating each of a plurality of subframes scheduled by a UL grant as corresponding to Mode A, the network device may indicate the last subframe in the plurality of subframes as corresponding to Mode C, thereby helping reduce control signaling overheads while ensuring indication flexibility.

Optionally, that the terminal device sends first uplink information in the first uplink subframe by using the second mode includes starting to send, by the terminal device, the first uplink information in the $2^{nd}$ slot of the first uplink subframe, where the first uplink subframe is the $1^{st}$ uplink subframe in the at least one uplink subframe.

Specifically, the first mode may correspond to Mode A, and the second mode may correspond to Mode B. When the first indication field indicates that each of the at least one uplink subframe is applicable to the first mode and the second indication field indicates that the first uplink subframe is applicable to the second mode, the terminal device starts to send the first uplink information in the $2^{nd}$ uplink subframe of the first uplink subframe. Further, the terminal device maps the first uplink information carried in the first uplink subframe to the $2^{nd}$ slot of the first uplink subframe instead of to the $1^{st}$ slot of the first uplink subframe.

As should be understood, that the terminal device starts to send the first uplink information in the $2^{nd}$ slot of the first uplink subframe may also be referred to as that a starting moment at which the terminal device sends uplink information in the first uplink subframe is located in the $2^{nd}$ slot of the first uplink subframe.

As should be further understood, that the starting moment is located in the $2^{nd}$ slot of the first uplink subframe includes the starting moment is located at a starting boundary of a symbol 7, a position that is 25 μs (the symbol 7+25 μs) after a starting boundary of a symbol 7, a position that is 25 μs+TA (symbol 7+25 μs+TA) after a starting boundary of a symbol 7, or a starting boundary of a symbol 8. A specific starting moment may be indicated by a UL grant, as described in the foregoing Mode B.

As should be further understood, that the starting moment is located at the starting boundary of the symbol 7 may also be referred to as "being located in the $2^{nd}$ slot" or "starting to send the first uplink information in the $2^{nd}$ slot".

It should be further understood that the first uplink information is uplink information carried in the first uplink subframe. Further, the first uplink subframe does not carry information other than the first uplink information.

Mode B is applicable to the $1^{st}$ uplink subframe in the at least one uplink subframe. Therefore, the first uplink subframe is the $1^{st}$ uplink subframe in the at least one uplink subframe. In this case, a starting moment at which the terminal device sends information in the $1^{st}$ uplink subframe is located in a slot #1 of the $1^{st}$ uplink subframe. The terminal device starts to send information in the $1^{st}$ uplink subframe from the starting moment of the $2^{nd}$ slot of the $1^{st}$ uplink subframe. Further, an ending moment at which the terminal device sends the first uplink information in the $1^{st}$ uplink subframe is located in the slot #1 of the $1^{st}$ uplink subframe. In other words, the terminal device stops sending the first uplink information in the slot #1 of the $1^{st}$ uplink subframe. Specifically, the ending moment is located in a symbol 12 or a symbol 3. More specifically, the ending moment may be indicated by a UL grant, as described in the foregoing Mode B.

Optionally, that the terminal device sends first uplink information in the first uplink subframe by using the second mode includes mapping, by the terminal device, the first uplink information carried in the first uplink subframe to the $2^{nd}$ slot of the first uplink subframe instead of to the $1^{st}$ slot of the first uplink subframe.

In other words, the terminal device maps uplink information carried in the first uplink subframe to only the $2^{nd}$ slot of the first uplink subframe.

The first uplink information carried in the first uplink subframe may also be referred to as a first uplink information packet carried in the first uplink subframe, and the first uplink information packet is a packet (packet) generated after the uplink information is encoded. Because the UL grant indicates that the terminal device sends information only in the slot #1 of the first uplink subframe, the terminal device may perform packet assembly of an information packet in advance, map the first uplink information packet to the slot #1 in a rate matching (rate matching) manner, and enable the first uplink information packet to match a time-frequency domain resource (for example, four, five, six, or seven time domain symbols) of the slot #1.

Further, if the first uplink information packet is a data packet, a transport block size (Transport Block Size, TBS) of the data packet may be determined through TBS scaling (TBS scaling). For example, when the UL grant indicates the terminal device to enable Mode B, for the first uplink subframe, because the data packet is mapped only to the slot #1 in the first uplink subframe, a TBS of a data packet that corresponds when the terminal device performs data packet assembly based on the UL grant is less than a TBS that corresponds when the data packet is mapped to two slots. For example, the former TBS is approximately half of the latter TBS.

For example, when the first uplink information carried in the first uplink subframe includes data information, the first uplink information packet (referred to as a data packet) including the data information is mapped to the $2^{nd}$ slot of the first uplink subframe instead of to the $1^{st}$ slot of the first uplink subframe. The data packet is a data packet obtained after original data information (referred to as information element information or a transport block (transport block, TB)) is encoded.

For another example, when the first uplink information carried in the first uplink subframe includes control information, the first uplink information packet including the control information is mapped to the $2^{nd}$ slot of the first uplink subframe instead of to the $1^{st}$ slot of the first uplink subframe. The first uplink information packet is an information packet obtained after original control information is encoded. Optionally, the control information includes at least one of HARQ-ACK information, CQI information, PMI information, and RI information.

Figure 12:
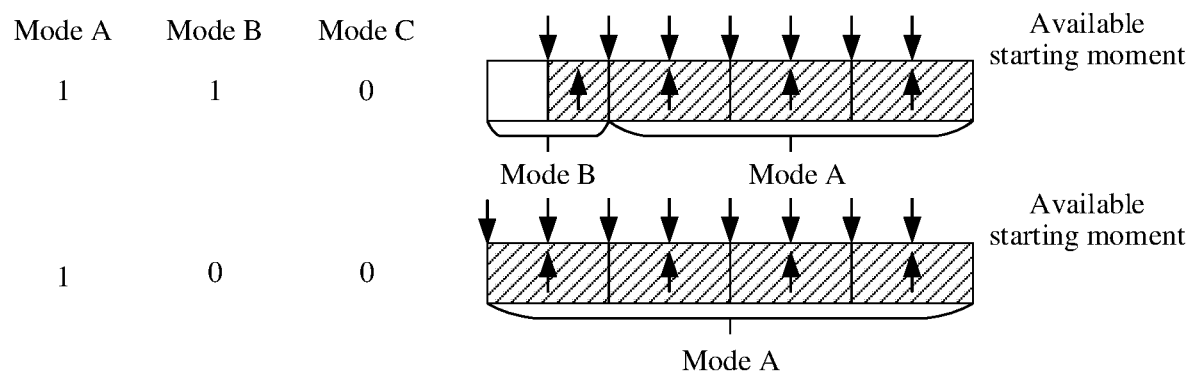
FIG. 12 is a schematic diagram of a transmission manner used when a UL grant indicates Mode A and Mode B.

FIG. 12 shows transmission manners used when a UL grant indicates Mode A and Mode B. A first mode is Mode A, and a second mode is Mode B. When the UL grant indicates to enable both Mode A and Mode B, for a plurality of subframes #n to #n+3 scheduled by the UL grant, a terminal device sends information in the $1^{st}$ subframe in the plurality of subframes by using Mode B, and sends information in another subsequent subframe by using Mode A. In other words, the terminal device performs channel listening before a starting moment of a slot #1 of the subframe #n. If the channel listening succeeds, the terminal device accesses a channel to send the slot #1 and a remaining subframe. If the channel listening fails, the terminal device sequentially performs channel listening in a slot #0 of the subframe #n+1, a slot #1 of the subframe #n+1, a slot #0 of the subframe #n+2, a slot #1 of the subframe #n+2, a slot #0 of the subframe #n+3, and a slot #1 of the subframe #n+3, until the channel listening succeeds and the terminal device accesses the channel to send a remaining slot and subframe. When the UL grant indicates to enable Mode A and not to enable Mode B, for a plurality of subframes scheduled by the UL grant, the terminal device sends information in each of the plurality of subframes by using Mode A. To be specific, the terminal device sequentially performs channel listening in the slot #0 of the subframe #n, the slot #1 of the subframe #n, the slot #0 of the subframe #n+1, the slot #1 of the subframe #n+1, the slot #0 of the subframe #n+2, the slot #1 of the subframe #n+2, the slot #0 of the subframe #n+3, and the slot #1 of the subframe #n+3, until the channel listening succeeds and the terminal device accesses a channel to send a remaining slot and subframe.

Optionally, that the terminal device sends first uplink information in the first uplink subframe by using the second mode includes stopping sending the first uplink information in the $1^{st}$ slot of the first uplink subframe, where the first uplink subframe is the last uplink subframe in the at least one uplink subframe.

Specifically, the first mode may correspond to Mode A, and the second mode may correspond to Mode C. When the first indication field indicates that each of the at least one uplink subframe is applicable to the first mode and the second indication field indicates that the first uplink subframe is applicable to the second mode, the terminal device stops sending the first uplink information in the $1^{st}$ uplink subframe of the first uplink subframe. In other words, the terminal device maps the first uplink information carried in the first uplink subframe to the $1^{st}$ slot of the first uplink subframe instead of to the $2^{nd}$ slot of the first uplink subframe.

As should be understood, that the terminal device stops sending the first uplink information in the $1^{st}$ slot of the first uplink subframe may also be referred to as that an ending moment at which the terminal device sends uplink information in the first uplink subframe is located in the $1^{st}$ slot of the first uplink subframe.

As should be further understood, that the ending moment is located in the $1^{st}$ slot of the first uplink subframe includes that the ending moment is located in a symbol 3 or a symbol 6. More specifically, the ending moment may be indicated by a UL grant, as described in the foregoing Mode C.

As should be further understood, that the ending moment is located in a symbol 3 or a symbol 6 may also be referred to as "being located in the $1^{st}$ slot" or "stopping sending the first uplink information in the $1^{st}$ slot".

It should be further understood that the first uplink information is uplink information carried in the first uplink subframe. Further, the first uplink subframe does not carry information other than the first uplink information.

Mode C is applicable to the last uplink subframe in the at least one uplink subframe. Therefore, the first uplink subframe is the last uplink subframe in the at least one uplink subframe. In this case, an ending moment at which the terminal device sends information in the last uplink subframe is located in a slot #0 of the last uplink subframe. In other words, the terminal device stops sending the first uplink information in the last uplink subframe at the ending moment located in the $1^{st}$ slot of the last uplink subframe. Further, a starting moment at which the terminal device sends information in the last uplink subframe is located at a starting boundary of the symbol #0 in the slot #0 of the last uplink subframe, a position that is 25 μs after a starting boundary of the symbol #0, a position that is 25 μs+TA after a starting boundary of the symbol #0, or a starting boundary of the symbol #1. Further, the starting moment may be indicated by a UL grant, as described in the foregoing Mode C.

Optionally, that the terminal device sends first uplink information in the first uplink subframe by using the second mode includes mapping, by the terminal device, the first uplink information carried in the first uplink subframe to the $1^{st}$ slot of the first uplink subframe instead of to the $2^{nd}$ slot of the first uplink subframe.

In other words, the terminal device maps the first uplink information carried in the first uplink subframe to only the $1^{st}$ slot of the first uplink subframe.

Because the UL grant indicates that the terminal device sends the first uplink information (or third uplink information or fourth uplink information described below) only in the slot #0 of the first uplink subframe (or a third uplink subframe described below), the terminal device may perform packet assembly of an uplink information packet in advance, map the information packet to the slot #0 in a rate matching (rate matching) manner, and enable the uplink information packet to match a time-frequency domain resource (for example, two, three, four, five, six, or seven time domain symbols) of the slot #0. Further, if the uplink information packet is a data packet, a TBS of the data packet may be determined through TBS scaling (TBS scaling). This is similar to a TBS determining method in Mode B.

For example, when the first uplink information (or the third uplink information or the fourth uplink information described below) carried in the first uplink subframe (or the third uplink subframe described below) includes data information, the first uplink information packet (referred to as a data packet) including the data information is mapped to the $1^{st}$ slot of the subframe instead of to the $2^{nd}$ slot of the first uplink subframe. A definition of the data packet is the same as that described above.

For another example, when the uplink information carried in the first uplink subframe (or the third uplink subframe described below) includes control information, the uplink information packet including the control information is mapped to the $1^{st}$ slot of the subframe instead of to the $2^{nd}$ slot of the first uplink subframe. The uplink information packet is an uplink information packet obtained after original control information is encoded. A definition of the uplink information packet is the same as that described above.

Figure 13:
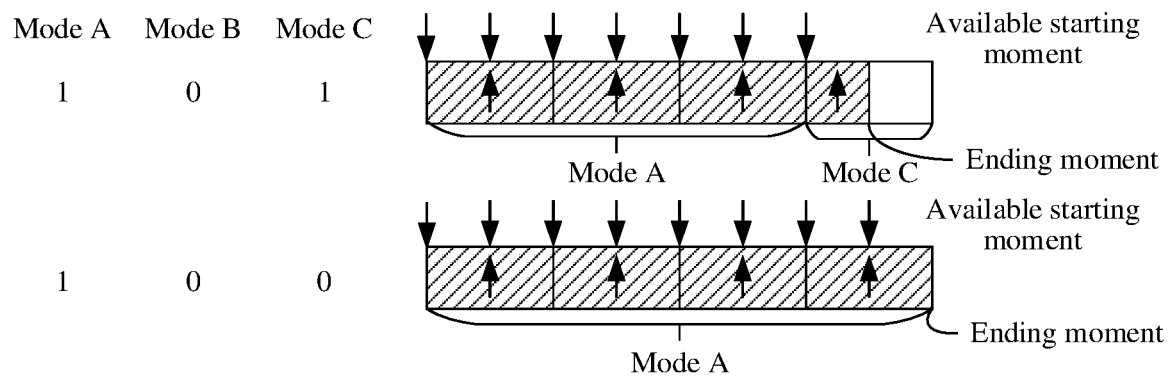
FIG. 13 is a schematic diagram of a transmission manner used when a UL grant indicates Mode A and Mode C.

FIG. 13 shows transmission manners used when a UL grant indicates Mode A and Mode C. The first mode is Mode A, and the second mode is Mode C. When the UL grant indicates to enable both Mode A and Mode C, for a plurality of subframes #n to #n+3 scheduled by the UL grant, the terminal device sends information in the last subframe in the plurality of subframes by using Mode C. In other words, an ending moment in the subframe #n+3 is a symbol #6 in a slot #0, and ending moments in the subframe #n to the subframe #n+2 are a symbol #13 in a slot #1. The terminal device sends information in another subframe of the plurality of uplink subframes by using Mode A. When the UL grant indicates to enable Mode A and not to enable Mode C, for a plurality of subframes scheduled by the UL grant, the terminal device sends information in each of the plurality of subframes by using Mode A, in other words, ending moments in the subframe #n to the subframe #n+3 are all the symbol #13 located in the slot #1.

Optionally, the method 200 further includes when the first indication field indicates that each of the at least one uplink subframe is applicable to the first mode and the second indication field indicates that the first uplink subframe is not applicable to the second mode, sending, by the terminal device, sixth uplink information in the first uplink subframe by using the first mode, where the sixth uplink information may be the same as or different from the first uplink information.

When the terminal device sends uplink information in an uplink subframe (the first uplink subframe, the second uplink subframe, or the third uplink subframe) by using Mode A, the uplink subframe includes two potential starting moments, and the terminal device determines, based on a channel listening result, to start to send uplink information in the uplink subframe from one of the potential starting moments. If the terminal device successfully performs channel listening before the $1^{st}$ potential starting moment, the terminal device may start to send uplink information in the uplink subframe in the $1^{st}$ potential starting moment. If the terminal device fails to perform channel listening before the $1^{st}$ potential starting moment, and continues to perform channel listening successfully before the $2^{nd}$ potential starting moment, the terminal device may start to send uplink information in the uplink subframe in the $2^{nd}$ potential starting moment.

The $1^{st}$ potential starting moment is located in a slot #0 of the uplink subframe. Specifically, the $1^{st}$ potential starting moment may be a starting boundary of a symbol #0 of the uplink subframe, a position that is 25 µs after a starting boundary of a symbol #0, a position that is 25 µs+TA after a starting boundary of a symbol #0, or a starting boundary of a symbol #1. More specifically, the $1^{st}$ potential starting moment may be indicated by a UL grant, as described in the foregoing Mode A. The $2^{nd}$ potential starting moment is located in a slot #1 of the uplink subframe. Specifically, the $2^{nd}$ potential starting moment is a symbol #7 of the uplink subframe.

Further, when the first indication field indicates that each of the at least one uplink subframe is applicable to the first mode and the second indication field indicates that the first uplink subframe is not applicable to the second mode, the terminal device sends uplink information in any of the at least one uplink subframe by using the first mode.

Optionally, the sending, by the terminal device, sixth uplink information in the first uplink subframe by using the first mode includes determining, by the terminal device based on a channel listening result, that a starting moment for sending the sixth uplink information in the first uplink subframe is located in the $1^{st}$ slot of the first uplink subframe or the $2^{nd}$ slot of the first uplink subframe, and sending, by the terminal device, the sixth uplink information in the first uplink subframe.

Optionally, the sending, by the terminal device, sixth uplink information in the first uplink subframe by using the first mode includes stopping sending, by the terminal device, the sixth uplink information in the $2^{nd}$ slot of the first uplink subframe.

That the terminal device stops sending the sixth uplink information in the $2^{nd}$ slot of the first uplink subframe may also be referred to as that an ending moment at which the terminal device stops sending the sixth uplink information in the first uplink subframe is located in the $2^{nd}$ slot of the first uplink subframe. Specifically, the ending moment is located in a symbol 12 or a symbol 3. More specifically, the ending moment may be indicated by a UL grant, as described in the foregoing Mode A.

Optionally, the sending, by the terminal device, sixth uplink information in the first uplink subframe by using the first mode includes mapping, by the terminal device, uplink information carried in the first uplink subframe to two slots of the first uplink subframe.

Optionally, the uplink information (that is, the uplink information mapped to the two slots) carried in the first uplink subframe includes the sixth uplink information. Specifically, the sixth uplink information may be the uplink information mapped to the two slots (for example, when the terminal device determines, based on a channel listening result, that the starting moment for sending the sixth uplink information is located in the $1^{st}$ slot of the first uplink subframe). The sixth uplink information may alternatively be included in the uplink information mapped to the two slots, for example, may be a part of the uplink information (for example, when the terminal device determines, based on a channel listening result, that the starting moment for sending the sixth uplink information is located in the $2^{nd}$ slot of the first uplink subframe).

For example, as shown in FIG. 12, when the UL grant indicates to enable Mode A and not to enable Mode B, for a plurality of subframes scheduled by the UL grant, the terminal device sends information in the $1^{st}$ subframe in the plurality of subframes by using Mode A. In other words, the terminal device sends information in any of the plurality of subframes by using Mode A.

For another example, as shown in FIG. 13, when the UL grant indicates to enable Mode A and not to enable Mode C, for a plurality of subframes scheduled by the UL grant, the terminal device sends information in the last subframe in the plurality of subframes by using Mode A. In other words, the terminal device sends information in any of the plurality of subframes by using Mode A.

Optionally, the method 200 further includes sending, by the terminal device, second uplink information in a second uplink subframe by using the first mode, where the second uplink subframe is any uplink subframe other than the first uplink subframe in the at least one uplink subframe.

In other words, when the first indication field indicates that each of the at least one uplink subframe is applicable to the first mode and the second indication field indicates that the first uplink subframe is applicable to the second mode, the terminal device sends any uplink subframe other than the first uplink subframe in the at least one uplink subframe by using the first mode.

Alternatively, when the first indication field indicates that each of the at least one uplink subframe corresponds to the first mode and the second indication field is used to indicate that the first uplink subframe is not applicable to the second mode, the terminal device sends an uplink subframe other than the first uplink subframe in the at least one uplink subframe by using the first mode. In other words, the terminal device sends any of the at least one uplink subframe by using the first mode.

Optionally, the sending, by the terminal device, second uplink information in the second uplink subframe by using the first mode includes determining, by the terminal device based on a channel listening result, that a starting moment for sending the second uplink information in the second uplink subframe is located in the $1^{st}$ slot of the second uplink subframe or the $2^{nd}$ slot of the second uplink subframe, and sending, by the terminal device, the second uplink information in the second uplink subframe.

Optionally, the sending, by the terminal device, second uplink information in the second uplink subframe by using the first mode includes stopping sending, by the terminal device, the second uplink information in the $2^{nd}$ slot of the second uplink subframe.

Optionally, the sending, by the terminal device, second uplink information in the second uplink subframe by using the first mode includes mapping, by the terminal device, uplink information carried in the second uplink subframe to two slots of the second uplink subframe.

Optionally, the uplink information (that is, the uplink information mapped to the two slots) carried in the second uplink subframe includes the second uplink information. Specifically, the second uplink information may be the uplink information mapped to the two slots, or may be included in the uplink information mapped to the two slots, for example, may be a part of the uplink information (for example, when the terminal device determines, based on a channel listening result, that the starting moment for sending the second uplink information is located in the $2^{nd}$ slot of the first uplink subframe).

It should be understood that a manner in which the terminal device sends the second uplink information in the second uplink subframe by using the first mode is the same as the foregoing manner in which the terminal device sends the sixth uplink information in the first uplink subframe by using the first mode. For brevity, details are not described herein again.

Optionally, the scheduling information further includes a third indication field, the third indication field is used to indicate whether a third uplink subframe is applicable to a third mode, the at least one uplink subframe includes the third uplink subframe, and the method further includes when the first indication field indicates that each of the at least one uplink subframe is applicable to the first mode, the second indication field indicates that the first uplink subframe is applicable to the second mode, and the third indication field indicates that the third uplink subframe is applicable to the third mode, sending, by the terminal device, third uplink information in the first uplink subframe by using the second mode, and sending, by the terminal device, fourth uplink information in the third uplink subframe by using the third mode.

In this case, if the scheduling information received by the terminal device indicates that the first mode, the second mode, and the third mode are all enabled, the terminal device sends the third uplink information in the first uplink subframe by using the second mode, and sends the fourth uplink information in the third uplink subframe by using the third mode. In other words, because both the first mode and the second mode are applicable to the first uplink subframe and both the first mode and the third mode are applicable to the third uplink subframe, when the first mode, the second mode, and the third mode are all enabled, for the first uplink subframe, the second mode overrides (override) the first mode to avoid a conflict, and for the third uplink subframe, the third mode overrides (override) the first mode to avoid a conflict.

Therefore, according to the communication method in this embodiment of this application, the network device is allowed to indicate a plurality of transmission modes of an uplink subframe in the scheduling information, and a behavior of the terminal device for a plurality of subframes whose transmission modes conflict with each other is defined. This helps improve indication flexibility of a transmission mode of an uplink subframe.

It should be understood that, in this embodiment of this application, the second mode may correspond to Mode B, the first uplink subframe may correspond to the $1^{st}$ uplink subframe in the at least one uplink subframe, the third mode may correspond to Mode C, and the third uplink subframe may correspond to the last uplink subframe in the at least one uplink subframe, or the second mode may correspond to Mode C, the first uplink subframe may correspond to the last uplink subframe in the at least one uplink subframe, the third mode may correspond to Mode B, and the third uplink subframe may correspond to the $1^{st}$ uplink subframe in the at least one uplink subframe.

It should be noted that, in addition to the first indication field and the second indication field, the scheduling information may further include the third indication field, which is used to indicate whether another specific uplink subframe other than the first uplink subframe is applicable to the third mode. Similar to the case in which both the first mode and the second mode are enabled, when the first mode, the second mode, and the third mode are all enabled, the terminal device actually sends the first uplink subframe by using the second mode, actually sends the third uplink subframe by using the third mode, and actually sends a remaining uplink subframe in the at least one uplink subframe by using the first mode. The terminal device actually sends the second uplink subframe by using the first mode, where the second uplink subframe is any uplink subframe other than the first uplink subframe and the third uplink subframe in the at least one uplink subframe.

In addition, similar to the case in which the first indication field and the second indication field respectively indicate the first mode and the second mode, when the first indication field indicates that each of the at least one uplink subframe is applicable to the first mode and the third indication field is used to indicate that the third uplink subframe is not applicable to the third mode, the terminal device actually sends uplink information in the third uplink subframe by using the first mode. That the terminal device actually sends information in the third uplink subframe by using the first mode (for example, Mode A) includes determining, by the terminal device based on a channel listening result, that a starting moment at which the terminal device sends uplink information in the third uplink subframe is located in the $1^{st}$ slot of the third uplink subframe or the $2^{nd}$ slot of the third uplink subframe.

Further, when the first indication field indicates that each of the at least one uplink subframe is applicable to the first mode, the second indication field indicates that the first uplink subframe is not applicable to the second mode, and the third indication field indicates that the third uplink subframe is not applicable to the third mode, the terminal device actually sends uplink information in any of the at least one uplink subframe by using the first mode.

It should be understood that a manner in which the terminal device sends the uplink information in any of the at least one uplink subframe by using the first mode is the same as the foregoing manner in which the terminal device sends the sixth uplink information in the first uplink subframe by using the first mode. For brevity, details are not described herein again.

Optionally, the method 200 further includes sending, by the terminal device, fifth uplink information in a second uplink subframe by using the first mode, where the second uplink subframe is any uplink subframe other than the first uplink subframe and the third uplink subframe in the at least one uplink subframe.

It should be understood that a manner in which the terminal device sends the fifth uplink information in the second uplink subframe by using the first mode is the same as the foregoing manner in which the terminal device sends the second uplink information in the second uplink subframe by using the first mode. For brevity, details are not described herein again.

It should be understood that a manner in which the terminal device sends the uplink information in the third uplink subframe by using the first mode is the same as the foregoing manner in which the terminal device sends the sixth uplink information in the first uplink subframe by using the first mode. For brevity, details are not described herein again.

Optionally, the sending, by the terminal device, third uplink information in the first uplink subframe by using the second mode, and sending, by the terminal device, fourth uplink information in the third uplink subframe by using the third mode includes starting to send, by the terminal device, the third uplink information in the $2^{nd}$ slot of the first uplink subframe, where the first uplink subframe is the $1^{st}$ uplink subframe in the at least one uplink subframe, and stopping sending, by the terminal device, the fourth uplink information in the $1^{st}$ slot of the third uplink subframe, where the third uplink subframe is the last uplink subframe in the at least one uplink subframe.

It should be understood that the second mode may be Mode B, and the third mode may be Mode C.

Optionally, the sending, by the terminal device, third uplink information in the first uplink subframe by using the second mode includes mapping, by the terminal device, the third uplink information carried in the first uplink subframe to the $2^{nd}$ slot of the first uplink subframe instead of to the $1^{st}$ slot of the first uplink subframe.

It should be understood that, the terminal device stops sending the third uplink information in the $2^{nd}$ slot of the first uplink subframe.

It should be further understood that the third uplink information is uplink information carried in the first uplink subframe. Further, the first uplink subframe does not carry information other than the third uplink information.

It should be further understood that a manner in which the terminal device sends the third uplink information in the first uplink subframe by using the second mode is the same as the manner in which the terminal device sends the first uplink information in the first uplink subframe by using the second mode corresponding to Mode B.

Optionally, the sending, by the terminal device, fourth uplink information in the third uplink subframe by using the third mode includes mapping, by the terminal device, the fourth uplink information carried in the third uplink subframe to the $1^{st}$ slot of the third uplink subframe instead of to the $2^{nd}$ slot of the third uplink subframe.

It should be understood that, the terminal device starts to send the fourth uplink information in the $1^{st}$ slot of the third uplink subframe.

It should be further understood that the fourth uplink information is uplink information carried in the third uplink subframe. Further, the third uplink subframe does not carry information other than the fourth uplink information.

It should be further understood that a manner in which the terminal device sends the fourth uplink information in the third uplink subframe by using the third mode is the same as the manner in which the terminal device sends the first uplink information in the first uplink subframe by using the second mode corresponding to Mode C.

Optionally, the sending, by the terminal device, fifth uplink information in the second uplink subframe by using the first mode includes determining, by the terminal device based on a channel listening result, that a starting moment for sending the fifth uplink information in the second uplink subframe is located in the $1^{st}$ slot of the second uplink subframe or the $2^{nd}$ slot of the second uplink subframe, and sending, by the terminal device, the fifth uplink information in the second uplink subframe.

Optionally, the sending, by the terminal device, fifth uplink information in the second uplink subframe by using the first mode includes stopping sending, by the terminal device, the fifth uplink information in the $2^{nd}$ slot of the second uplink subframe.

Optionally, the sending, by the terminal device, fifth uplink information in the second uplink subframe by using the first mode includes mapping, by the terminal device, the fifth uplink information carried in the second uplink subframe to two slots of the second uplink subframe.

Optionally, the uplink information (that is, the uplink information mapped to the two slots) carried in the second uplink subframe includes the fifth uplink information. Specifically, the fifth uplink information may be the uplink information mapped to the two slots, or may be included in the uplink information mapped to the two slots, for example, may be a part of the uplink information (for example, when the terminal device determines, based on a channel listening result, that the starting moment for sending the fifth uplink information is located in the $2^{nd}$ slot of the first uplink subframe).

Optionally, the first indication field may be represented in a DCI format 0B or a DCI format 4B as follows: Partial PUSCH Mode 1—applicable to each scheduled subframe except the $1^{st}$ scheduled subframe in a case of the value of "Partial PUSCH Mode 2" being 1 and the last scheduled subframe in a case of the value of "Partial PUSCH Mode 3" being 1.

Partial PUSCH Mode 1 is the first mode or Mode A, and may also be referred to as PUSCH Mode 1. Partial PUSCH Mode 2 is the second mode or Mode B, and may also be referred to as PUSCH Mode 2. Partial PUSCH Mode 3 is the second mode, the third mode, or Mode C, and may also be referred to as PUSCH Mode 3.

For another example, the second indication field may be represented in a DCI format 0B or a DCI format 4B as follows: Partial PUSCH Mode 2—applicable to only the $1^{st}$ scheduled subframe.

For another example, the second indication field may be represented in a DCI format 0B or a DCI format 4B as follows: Partial PUSCH Mode 3—applicable to only the last scheduled subframe.

For another example, the third indication field may be represented in a DCI format 0B or a DCI format 4B as follows: Partial PUSCH Mode 3—applicable to only the last scheduled subframe.

Figure 14:
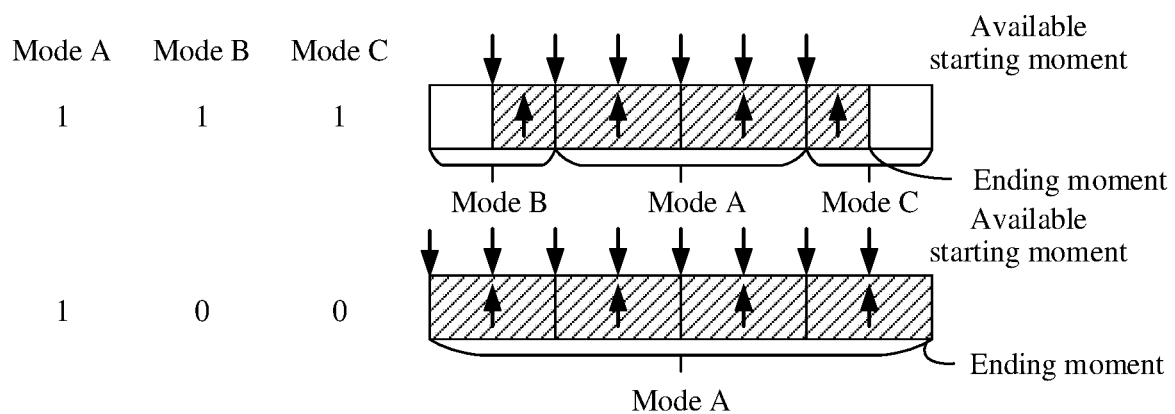
FIG. 14 is a schematic diagram of a transmission manner used when a UL grant indicates Mode A, Mode B, and Mode C.

FIG. 14 shows transmission manners used when a UL grant indicates Mode A, Mode B, and Mode C. A first mode is Mode A, a second mode is Mode B, and a third mode is Mode C. When the UL grant indicates to enable Mode A, Mode B, and Mode C, for a plurality of subframes #n to #n+3 scheduled by the UL grant, a terminal device sends information in the $1^{st}$ subframe in the plurality of subframes by using Mode A, sends information in the last subframe in the plurality of subframes by using Mode C, and sends information in another intermediate subframe by using Mode A. When the UL grant indicates to enable Mode A and not to enable Mode B or Mode C, for a plurality of subframes scheduled by the UL grant, the terminal device sends information in each of the plurality of subframes by using Mode A.

Further, in this embodiment of this application, that the terminal device actually sends uplink information in an uplink subframe (for example, any of the at least one subframe, a first uplink subframe, a second uplink subframe, or a third uplink subframe) by using the first mode includes an ending moment at which the terminal device sends the uplink information in the uplink subframe is located in the $2^{nd}$ slot of the uplink subframe.

A difference between Mode A and Mode C is that in an uplink subframe in which uplink information is sent by using Mode A, an ending moment at which the terminal device sends information is located in the $2^{nd}$ slot of the uplink subframe, and in an uplink subframe in which uplink information is sent by using Mode C, an ending moment at which the terminal device sends information is located in the $1^{st}$ slot of the uplink subframe. Therefore, for the uplink subframe, the ending moment at which the terminal device actually sends information by using Mode A is different from the ending moment at which the terminal device actually sends information by using Mode C.

Further, a mapping manner for uplink information carried in an uplink subframe (for example, any of the at least one subframe, the first uplink subframe, the second uplink subframe, or the third uplink subframe) corresponding to Mode A is mapping the uplink information to two slots included in the uplink subframe, in other words, mapping an information packet including the uplink information to two slots included in the uplink subframe. In other words, because a physical layer resource mapping process of the uplink information packet may be performed before the terminal device learns of an LBT result, regardless of whether LBT succeeds before a starting moment of a slot #0 of the uplink subframe or before a starting moment of a slot #1 of the uplink subframe, the terminal device maps the information packet to two slots included in the uplink subframe, when performing physical layer resource mapping.

In addition, it should be understood that when the starting moment determined by the terminal device based on the LBT result is located in the slot #1, the terminal device discards or punctures (puncture) the uplink information mapped to the slot #0. In other words, when the terminal device fails to perform LBT before the starting moment in the slot #0, and successfully performs channel listening before the starting moment in the slot #1, the terminal device discards the uplink information in the slot #0, and sends only a part that is of the information packet and that is carried in the slot #1. In other words, the terminal device punctures (puncture) the uplink information in the slot #0.

In other words, an encoded uplink information packet generated by the terminal device matches a time domain resource (for example, 10 symbols, 11 symbols, 12 symbols, 13 symbols, or 14 symbols) of (two slots included in) the uplink subframe. When the terminal device determines, based on a channel listening result, that the slot #0 of the subframe is available (that is, channel listening succeeds before a potential starting moment of the slot #0), the terminal device starts to send the uplink information packet from the slot #0 of the uplink subframe. When the terminal device determines, based on a channel listening result, that the slot #1 of the uplink subframe is available (that is, LBT fails before a potential starting moment of the slot #0 and channel listening succeeds before a potential starting moment of the slot #1), the terminal device starts to send the uplink information packet from the slot #1 of the uplink subframe. It should be noted that the terminal device performs, in advance, packet assembly on information to be mapped to the uplink subframe. Therefore, when a detection result is that the slot #0 is unavailable but the slot #1 is available, due to a limited processing capability, the terminal device cannot regenerate another encoded uplink information packet that matches the time domain resource of the slot #1. Therefore, the terminal device discards some information matching the slot #0 in the uplink information packet that is generated in advance and that matches the time domain resource of the uplink subframe, in other words, after the uplink information packet is punctured (puncture), the uplink information packet matches the time domain resource of the slot #1, and a punctured part of the uplink information packet is transmitted in the slot #1.

For example, when uplink information carried in the uplink subframe (for example, any of the at least one subframe, the first uplink subframe, the second uplink subframe, or the third uplink subframe) includes data information, an uplink information packet (referred to as a data packet) including the data information is mapped to two slots included in the subframe. A definition of the data packet is the same as that described above.

For another example, when the uplink information carried in the uplink subframe includes control information, an uplink information packet including the control information is mapped to two slots included in the uplink subframe. The uplink information packet is an uplink information packet obtained after original control information is encoded. A definition of the uplink information packet is the same as that described above.

As should be understood, that the terminal device sends an uplink subframe (for example, any of the at least one uplink subframe, the first uplink subframe, the second uplink subframe, or the third uplink subframe) may also be referred to as that the terminal device sends uplink information in the uplink subframe. The terminal device may occupy all time domain resources (for example, 14 time domain symbols) of the uplink subframe to send the uplink information, or may occupy only some time domain resources (for example, less than 14 time domain symbols) of the uplink subframe to send the uplink information.

Specifically, a starting moment of some time domain resources may be a starting boundary of a symbol #0, or between a symbol #0 and a symbol #1, or a starting boundary of a symbol #1, or a starting boundary of a symbol #7, or between a symbol #7 and a symbol #8, or a starting boundary of a symbol #8.

Specifically, an ending moment of some time domain resources may be an ending boundary of a symbol #12, an ending boundary of a symbol #13, an ending boundary of a symbol #6, or an ending boundary of a symbol #3. The position between the symbol #0 and the symbol #1 may be a position that is 25 μs after the symbol #0 or a position that is 25 μs+TA after the symbol #0, and the position between the symbol #7 and the symbol #8 may be a position that is 25 μs after the symbol #7 or a position that is 25 μs+TA after the symbol #7, as described above.

Similarly, that the terminal device maps the uplink information to a slot included in the uplink subframe (for example, to the $1^{st}$ slot, the $2^{nd}$ slot, or two slots) specifically includes the uplink information may be mapped to all time domain resources included in the slot or to only some time domain resources included in the slot.

As should be noted, in this embodiment of this application, when the terminal device correspondingly sends information in any uplink subframe (for example, any of the at least one subframe, the first uplink subframe, the second uplink subframe, or the third uplink subframe) by using any mode (for example, the first mode, the second mode, or the third mode, and for another example, Mode A, Mode B, or Mode C), the following is satisfied: Before sending the uplink subframe, the terminal device successfully performs LBT on a carrier on which the uplink subframe is located. The uplink subframe may be the $1^{st}$ uplink subframe sent after LBT is successfully performed, or may be one of a plurality of uplink subframes that are sent continuously in a time period after LBT is successfully performed, for example, an uplink subframe after the $1^{st}$ uplink subframe sent after the LBT is successfully performed.

For example, when the first indication field indicates that each of the at least one uplink subframe is applicable to the first mode, the second indication field indicates that the first uplink subframe is applicable to the second mode, and the third indication field indicates that the third uplink subframe is applicable to the third mode, the terminal device sends, if the terminal device successfully performs channel listening, third uplink information in the first uplink subframe by using the second mode. The terminal device sends, if the terminal device successfully performs channel listening, fourth uplink information in the third uplink subframe by using the third mode. That the terminal device sends, if the terminal device successfully performs channel listening, third uplink information in the first uplink subframe by using the second mode includes successfully performing, by the terminal device, channel listening before a starting moment in the $2^{nd}$ slot of the first uplink subframe. That the terminal device sends, if the terminal device successfully performs channel listening, fourth uplink information in the third uplink subframe by using the third mode includes successfully performing, by the terminal device, channel listening before a starting moment in the $1^{st}$ slot of the third uplink subframe.

In addition, before sending the uplink subframe, if the terminal device fails to perform LBT on the carrier on which the uplink subframe is located and fails to occupy the uplink subframe to send information, it may also be referred to as that the mode is correspondingly used for the uplink subframe.

The foregoing describes the communication methods according to the embodiments of this application in detail with reference to FIG. 1 to FIG. 14. The following describes communications apparatuses according to the embodiments of this application with reference to FIG. 15 to FIG. 17. The technical features described in the method embodiments are also applicable to the following apparatus embodiments.

Figure 15:
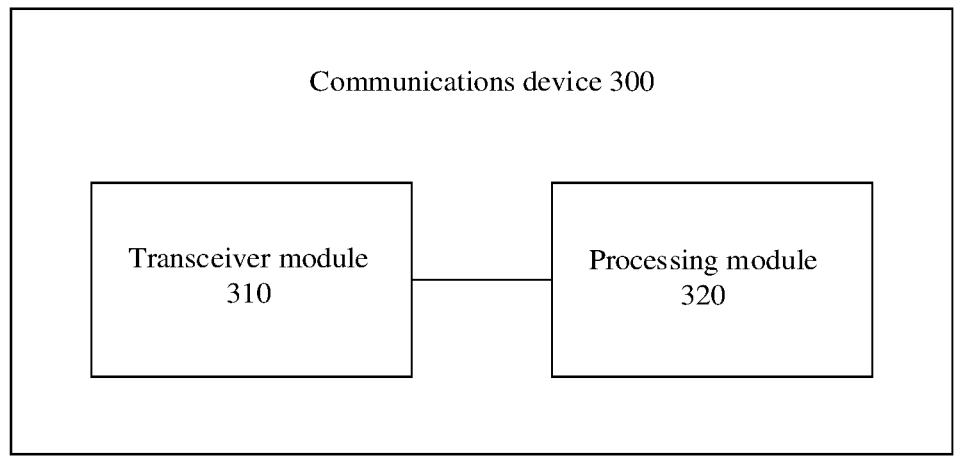
FIG. 15 is a schematic block diagram of a communications apparatus according to an embodiment of this application.

FIG. 15 is a schematic block diagram of a communications apparatus 300 according to an embodiment of this application. As shown in FIG. 15, the communications apparatus 300 includes a transceiver module 310 and a processing module 320.

The transceiver module 310 is configured to receive scheduling information from a network device, where the scheduling information is used to indicate at least one uplink subframe, the scheduling information includes a first indication field and a second indication field, the first indication field is used to indicate whether each of the at least one uplink subframe is applicable to a first mode, the second indication field is used to indicate whether a first uplink subframe is applicable to a second mode, and the at least one uplink subframe includes the first uplink subframe.

The processing module 320 is configured to when the first indication field indicates that each of the at least one uplink subframe is applicable to the first mode and the second indication field indicates that the first uplink subframe is applicable to the second mode, control the transceiver module 310 to send first uplink information in the first uplink subframe by using the second mode.

Optionally, the at least one uplink subframe is at least two uplink subframes.

Optionally, the at least one uplink subframe is all uplink subframes scheduled by using the scheduling information.

Optionally, the processing module 320 is specifically configured to control the transceiver module 310 to start to send the first uplink information in the $2^{nd}$ slot of the first uplink subframe, where the first uplink subframe is the $1^{st}$ uplink subframe in the at least one uplink subframe.

Optionally, the processing module 320 is specifically configured to map the first uplink information carried in the first uplink subframe to the $2^{nd}$ slot of the first uplink subframe instead of to the $1^{st}$ slot of the first uplink subframe.

Optionally, the processing module 320 is specifically configured to control the transceiver module 310 to stop sending the first uplink information in the $1^{st}$ slot of the first uplink subframe, where the first uplink subframe is the last uplink subframe in the at least one uplink subframe.

Optionally, the processing module 320 is specifically configured to map the first uplink information carried in the first uplink subframe to the $1^{st}$ slot of the first uplink subframe instead of to the $2^{nd}$ slot of the first uplink subframe.

Optionally, the processing module 320 is further configured to when the first indication field indicates that each of the at least one uplink subframe is applicable to the first mode and the second indication field indicates that the first uplink subframe is not applicable to the second mode, control the transceiver module 310 to send sixth uplink information in the first uplink subframe by using the first mode.

Optionally, the processing module 320 is specifically configured to control the transceiver module 310 to stop sending the sixth uplink information in the $2^{nd}$ slot of the first uplink subframe.

Optionally, the processing module 320 is specifically configured to map uplink information carried in the first uplink subframe to two slots of the first uplink subframe.

Optionally, the uplink information carried in the first uplink subframe includes the sixth uplink information.

Optionally, the processing module 320 is further configured to control the transceiver module 310 to send second uplink information in a second uplink subframe by using the first mode, where the second uplink subframe is any uplink subframe other than the first uplink subframe in the at least one uplink subframe.

Optionally, the processing module 320 is specifically configured to determine, based on a channel listening result, that a starting moment for sending the second uplink information in the second uplink subframe is located in the $1^{st}$ slot of the second uplink subframe or the $2^{nd}$ slot of the second uplink subframe, and control the transceiver module 310 to send the second uplink information in the second uplink subframe.

Optionally, the processing module 320 is specifically configured to control the transceiver module 310 to stop sending the second uplink information in the $2^{nd}$ slot of the second uplink subframe.

Optionally, the processing module 320 is specifically configured to map uplink information carried in the second uplink subframe to two slots of the second uplink subframe.

Optionally, the uplink information carried in the second uplink subframe includes the second uplink information.

Optionally, the scheduling information further includes a third indication field, the third indication field is used to indicate whether a third uplink subframe is applicable to a third mode, the at least one uplink subframe includes the third uplink subframe, and the processing module 320 is further configured to when the first indication field indicates that each of the at least one uplink subframe is applicable to the first mode, the second indication field indicates that the first uplink subframe is applicable to the second mode, and the third indication field indicates that the third uplink subframe is applicable to the third mode, control the transceiver module 310 to send third uplink information in the first uplink subframe by using the second mode, and control the transceiver module 310 to send fourth uplink information in the third uplink subframe by using the third mode.

Optionally, the processing module 320 is further configured to control the transceiver module 310 to send fifth uplink information in a second uplink subframe by using the first mode, where the second uplink subframe is any uplink subframe other than the first uplink subframe and the third uplink subframe in the at least one uplink subframe.

Optionally, the processing module 320 is specifically configured to control the transceiver module 310 to start to send the third uplink information in the $2^{nd}$ slot of the first uplink subframe, where the first uplink subframe is the $1^{st}$ uplink subframe in the at least one uplink subframe, and control the transceiver module 310 to stop sending the fourth uplink information in the $1^{st}$ slot of the third uplink subframe, where the third uplink subframe is the last uplink subframe in the at least one uplink subframe.

Optionally, the processing module 320 is specifically configured to map the third uplink information carried in the first uplink subframe to the $2^{nd}$ slot of the first uplink subframe instead of to the $1^{st}$ slot of the first uplink subframe.

Optionally, the processing module 320 is specifically configured to map the fourth uplink information carried in the third uplink subframe to the $1^{st}$ slot of the third uplink subframe instead of to the $2^{nd}$ slot of the third uplink subframe.

Optionally, the processing module 320 is specifically configured to determine, based on a channel listening result, that a starting moment for sending the fifth uplink information in the second uplink subframe is located in the $1^{st}$ slot of the second uplink subframe or the $2^{nd}$ slot of the second uplink subframe, and control the transceiver module 310 to send the fifth uplink information in the second uplink subframe.

Optionally, the processing module 320 is specifically configured to control the transceiver module 310 to stop sending the fifth uplink information in the $2^{nd}$ slot of the second uplink subframe.

Optionally, the processing module 320 is specifically configured to map uplink information carried in the second uplink subframe to two slots of the second uplink subframe.

Optionally, the uplink information carried in the second uplink subframe includes the fifth uplink information.

Optionally, the processing module 320 is further configured to when the first indication field indicates that each of the at least one uplink subframe is applicable to the first mode, the second indication field indicates that the first uplink subframe is not applicable to the second mode, and the third indication field indicates that the third uplink subframe is not applicable to the third mode, control the transceiver module 310 to send uplink information in any of the at least one uplink subframe by using the first mode.

Optionally, the processing module 320 is specifically configured to determine, based on a channel listening result, that a starting moment for sending the uplink information in any of the at least one uplink subframe is located in the $1^{st}$ slot of any of the at least one uplink subframe or the $2^{nd}$ slot of any of the at least one uplink subframe, and control the transceiver module 310 to send the uplink information in any of the at least one uplink subframe.

Optionally, the processing module 320 is specifically configured to control the transceiver module 310 to stop sending the uplink information in the $2^{nd}$ slot of any uplink subframe.

Optionally, the processing module 320 is specifically configured to map the uplink information carried in the any uplink subframe to two slots of the any uplink subframe.

Specifically, the communications apparatus 300 may correspond to the terminal device in the communication method 200 according to the embodiments of this application. The communications apparatus 300 may include modules (or units) configured to perform the method performed by the terminal device in the communication method 200 in FIG. 11. In addition, the modules (or units) in the communications apparatus 300 and the foregoing other operations and/or functions are used to implement corresponding procedures of the communication method 200 in FIG. 11. A specific process of performing the corresponding step by each module (or unit) has been described in detail in the method 200. For brevity, details are not described herein again.

It should be understood that the communications apparatus 300 may be a terminal device, or may be a chip in a terminal device.

Figure 16:
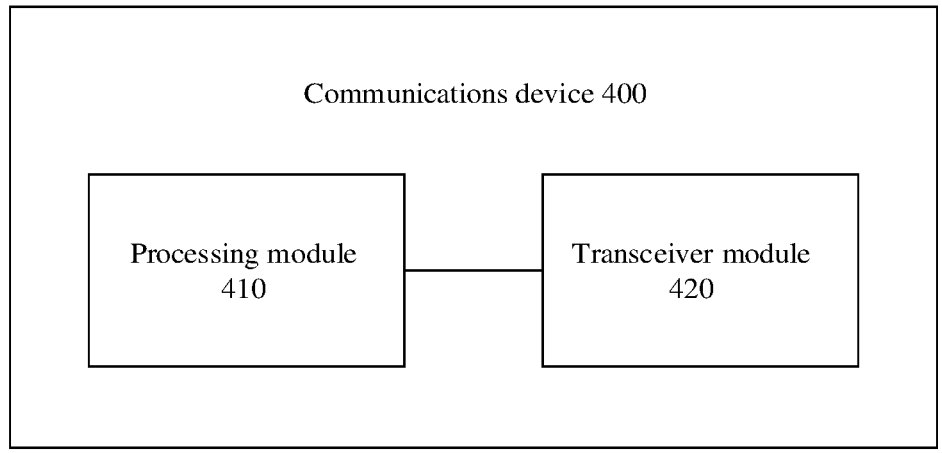
FIG. 16 is another schematic block diagram of a communications apparatus according to an embodiment of this application.

FIG. 16 is a schematic block diagram of a communications apparatus 400 according to an embodiment of this application. As shown in FIG. 16, the communications apparatus 400 includes a processing module 410 and a transceiver module 420.

The processing module 410 is configured to generate scheduling information, where the scheduling information is used to indicate at least one uplink subframe, the scheduling information includes a first indication field and a second indication field, the first indication field is used to indicate whether each of the at least one uplink subframe is applicable to a first mode, the second indication field is used to indicate whether a first uplink subframe is applicable to a second mode, and the at least one uplink subframe includes the first uplink subframe.

The transceiver module 420 is configured to send the scheduling information to a terminal device.

The transceiver module 420 is further configured to when the first indication field indicates that each of the at least one uplink subframe is applicable to the first mode and the second indication field indicates that the first uplink subframe is applicable to the second mode, receive first uplink information sent by the terminal device in the first uplink subframe by using the second mode.

Optionally, the at least one uplink subframe is at least two uplink subframes.

Optionally, the at least one uplink subframe is all uplink subframes scheduled by using the scheduling information.

Optionally, the terminal device starts to send the first uplink information in the $2^{nd}$ slot of the first uplink subframe, where the first uplink subframe is the $1^{st}$ uplink subframe in the at least one uplink subframe.

Optionally, the terminal device maps the first uplink information to the $2^{nd}$ slot of the first uplink subframe instead of to the $1^{st}$ slot of the first uplink subframe.

Optionally, the terminal device stops sending the first uplink information in the $1^{st}$ slot of the first uplink subframe, and the first uplink subframe is the last uplink subframe in the at least one uplink subframe.

Optionally, the terminal device maps the first uplink information to the $1^{st}$ slot of the first uplink subframe instead of to the $2^{nd}$ slot of the first uplink subframe.

Optionally, the transceiver module 420 is further configured to when the first indication field indicates that each of the at least one uplink subframe is applicable to the first mode and the second indication field indicates that the first uplink subframe is not applicable to the second mode, receive sixth uplink information sent by the terminal device in the first uplink subframe by using the first mode.

Optionally, the terminal device stops sending the sixth uplink information in the $2^{nd}$ slot of the first uplink subframe.

Optionally, the terminal device maps the sixth uplink information to two slots of the first uplink subframe.

Optionally, uplink information carried in the first uplink subframe includes the sixth uplink information.

Optionally, the transceiver module 420 is further configured to receive second uplink information sent by the terminal device in a second uplink subframe by using the first mode, where the second uplink subframe is any uplink subframe other than the first uplink subframe in the at least one uplink subframe.

Optionally, a start sending moment of the second uplink information in the second uplink subframe is determined by the terminal device based on a channel listening result, and the start sending moment is located in the $1^{st}$ slot of the second uplink subframe or the $2^{nd}$ slot of the second uplink subframe.

Optionally, the terminal device stops sending the second uplink information in the $2^{nd}$ slot of the second uplink subframe.

Optionally, the terminal device maps uplink information carried in the second uplink subframe to two slots of the second uplink subframe.

Optionally, the uplink information carried in the second uplink subframe includes the second uplink information.

Optionally, the scheduling information further includes a third indication field, the third indication field is used to indicate whether a third uplink subframe is applicable to a third mode, the at least one uplink subframe includes the third uplink subframe, and the transceiver module 420 is further configured to when the first indication field indicates that each of the at least one uplink subframe is applicable to the first mode, the second indication field indicates that the first uplink subframe is applicable to the second mode, and the third indication field indicates that the third uplink subframe is applicable to the third mode, receive third uplink information sent by the terminal device in the first uplink subframe by using the second mode, and receive fourth uplink information sent by the terminal device in the third uplink subframe by using the third mode.

Optionally, the transceiver module 420 is further configured to receive fifth uplink information sent by the terminal device in a second uplink subframe by using the first mode, where the second uplink subframe is any uplink subframe other than the first uplink subframe and the third uplink subframe in the at least one uplink subframe.

Optionally, the terminal device starts to send the third uplink information in the $2^{nd}$ slot of the first uplink subframe, the first uplink subframe is the $1^{st}$ uplink subframe in the at least one uplink subframe, the terminal device stops sending the fourth uplink information in the $1^{st}$ slot of the third uplink subframe, and the third uplink subframe is the last uplink subframe in the at least one uplink subframe.

Optionally, the terminal device maps the third uplink information to the $2^{nd}$ slot of the first uplink subframe instead of to the $1^{st}$ slot of the first uplink subframe.

Optionally, the terminal device maps the fourth uplink information to the $1^{st}$ slot of the third uplink subframe instead of to the $2^{nd}$ slot of the third uplink subframe.

Optionally, the terminal device stops sending the fifth uplink information in the $2^{nd}$ slot of the second uplink subframe.

Optionally, the terminal device maps uplink information carried in the second uplink subframe to two slots of the second uplink subframe.

Optionally, the uplink information carried in the second uplink subframe includes the fifth uplink information.

Optionally, the transceiver module 420 is further configured to when the first indication field indicates that each of the at least one uplink subframe is applicable to the first mode, the second indication field indicates that the first uplink subframe is not applicable to the second mode, and the third indication field indicates that the third uplink subframe is not applicable to the third mode, receive uplink information sent by the terminal device in any of the at least one uplink subframe by using the first mode.

Optionally, a start sending moment of the uplink information sent in any of the at least one uplink subframe is determined by the terminal device based on a channel listening result, and the start sending moment is located in the $1^{st}$ slot of any of the at least one uplink subframe or the $2^{nd}$ slot of any of the at least one uplink subframe.

Optionally, the terminal device stops sending the uplink information in the $2^{nd}$ slot of any uplink subframe.

Optionally, the terminal device maps uplink information carried in the any uplink subframe to two slots of the any uplink subframe.

Specifically, the communications apparatus 400 may correspond to the network device in the communication method 200 according to the embodiments of this application. The communications apparatus 400 may include modules (or units) configured to perform the method performed by the network device in the communication method 200 in FIG. 11. In addition, the modules (or units) in the communications apparatus 400 and the foregoing other operations and/or functions are used to implement corresponding procedures of the communication method 200 in FIG. 11. A specific process of performing the corresponding step by each module (or unit) has been described in detail in the method 200. For brevity, details are not described herein again.

It should be understood that the communications apparatus 400 may be a network device (or an access network device), or may be a chip in a network device (or an access network device).

Figure 17:
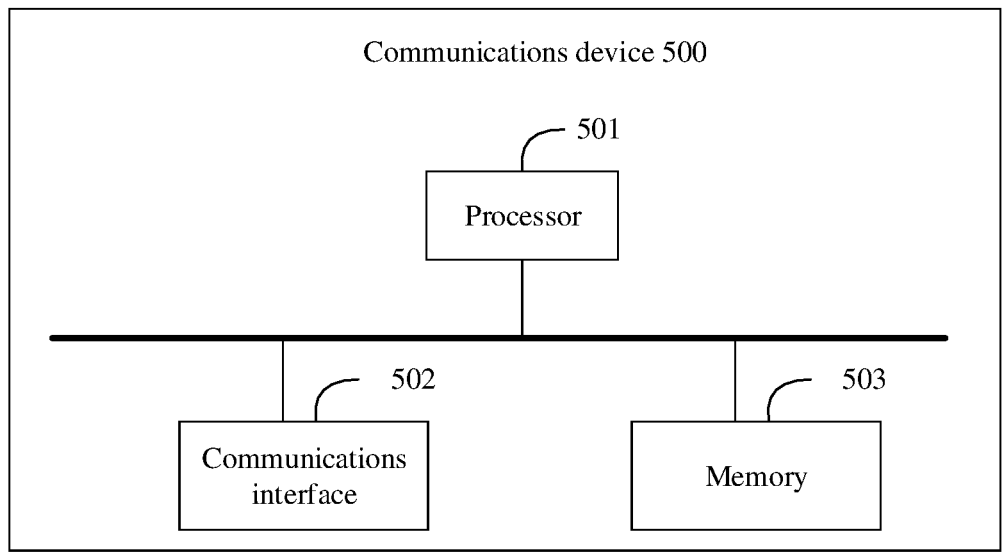
FIG. 17 is still another schematic block diagram of a communications apparatus according to an embodiment of this application.

It can be understood that, for the terminal device or the network device in the foregoing embodiments, a program instruction can be executed by a hardware platform having a processor and a communications interface to implement the functions in any one of the designs in the foregoing embodiments of this application. Based on this, FIG. 17 is schematic block diagram of a communications apparatus 500 according to an embodiment of this application. The communications apparatus 500 includes at least one processor 501. Optionally, the communications apparatus 500 includes a communications interface 502 and a memory 503. The communications interface 502 is configured to support the communications apparatus 500 in communicating and interacting with another device, and the memory 503 has a program instruction. The at least one processor 501 runs the program instruction, so that a function of operating on any one of the following devices in any design of the foregoing embodiments of this application is implemented a terminal device or a network device. In an optional design, the memory 503 may be configured to store a program instruction required for implementing the foregoing device functions or process data generated in a program execution process. Optionally, the communications apparatus 500 may further include an internal interconnection line, to implement communication interaction between the at least one processor 501, the communications interface 502, and the memory 503. The at least one processor 501 may be implemented by using a dedicated processing chip, a processing circuit, a processor, or a general-purpose chip. It may be understood that the methods, the procedures, the operations, or the steps in the designs described in the embodiments of this application can be implemented in a one-to-one correspondence manner by using computer software, electronic hardware, or a combination of computer software and electronic hardware. Whether these functions are performed in a hardware manner or a software manner depends on specific application and a design constraint of the technical solutions. For example, in consideration of aspects such as good universality, low costs, and decoupling between software and hardware, these functions may be implemented by executing a program instruction. For another example, in consideration of aspects such as system performance and reliability, these functions may be implemented by using a private circuit. A person of ordinary skill in the art may implement the described functions by using different methods for each particular application. This is not limited herein.

According to the methods provided in the embodiments of this application, this application further provides a computer program product. The computer program product includes computer program code. When the computer program code is run on a computer, the computer is enabled to perform the methods in the foregoing embodiments.

According to the methods provided in the embodiments of this application, this application further provides a computer-readable medium. The computer-readable medium stores program code. When the program code is run on a computer, the computer is enabled to perform the methods in the foregoing embodiments.

Based on the methods provided in the embodiments of this application, this application further provides a system, including the foregoing terminal device and/or network device.

All or some of the foregoing embodiments may be implemented by software, hardware, firmware, or any combination thereof. When software is used to implement the embodiments, all or some of the foregoing embodiments may be implemented in a form of computer program product. The computer program product includes one or more computer instructions. When the computer program instructions are loaded and executed on a computer, the procedures or functions in the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint of the technical solutions. A person skilled in the art may use different methods to implement the described functions for each particular application, but it should not be considered that such an implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the division of units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving scheduling information from an access network device, wherein the scheduling information indicates at least one uplink subframe, wherein the scheduling information comprises a first indication field, a second indication field, and a third indication field, wherein the first indication field indicates whether each of the at least one uplink subframe is applicable to a first mode, wherein the second indication field indicates whether a first uplink subframe is applicable to a second mode, wherein the third indication field indicates whether a third uplink subframe is applicable to a third mode, wherein the at least one uplink subframe comprises the third uplink subframe, and wherein the at least one uplink subframe comprises the first uplink subframe and the third uplink subframe;
   sending first uplink information in the first uplink subframe by using the second mode in response to the first indication field indicating that each of the at least one uplink subframe is applicable to the first mode and further in response to the second indication field indicating that the first uplink subframe is applicable to the second mode; and
   performing, in response to the first indication field indicating that each of the at least one uplink subframe is applicable to the first mode, further in response to the second indication field indicating that the first uplink subframe is applicable to the second mode, and further in response to the third indication field indicating that the third uplink subframe is applicable to the third mode:
   sending third uplink information in the first uplink subframe by using the second mode; and
   sending fourth uplink information in the third uplink subframe by using the third mode.

2. The method according to claim 1, wherein the sending first uplink information in the first uplink subframe by using the second mode comprises:
   starting to send the first uplink information in a slot second in position in the first uplink subframe, wherein the first uplink subframe is an uplink subframe first in position in the at least one uplink subframe.

3. The method according to claim 1, wherein the sending first uplink information in the first uplink subframe by using the second mode comprises:
   stopping sending the first uplink information in a slot first in position in the first uplink subframe, wherein the first uplink subframe is the last uplink subframe in the at least one uplink subframe.

4. The method according to claim 1, further comprising:
   sending second uplink information in a second uplink subframe by using the first mode, wherein the second uplink subframe is an uplink subframe other than the first uplink subframe in the at least one uplink subframe.

5. The method according to claim 4, wherein the sending second uplink information in the second uplink subframe by using the first mode comprises:
   determining, according to a channel listening result, that a starting moment for sending the second uplink information in the second uplink subframe is located in a slot first in position in the second uplink subframe or a slot second in position in the second uplink subframe; and
   sending the second uplink information in the second uplink subframe.

6. The method according to claim 1, further comprising:
   sending fifth uplink information in a second uplink subframe by using the first mode, wherein the second uplink subframe is uplink subframe other than the first uplink subframe and the third uplink subframe in the at least one uplink subframe.

7. The method according to claim 1, wherein the sending third uplink information in the first uplink subframe by using the second mode, and sending fourth uplink information in the third uplink subframe by using the third mode comprise:
   starting to send the third uplink information in a slot second in position in the first uplink subframe, wherein the first uplink subframe is an uplink subframe first in position in the at least one uplink subframe; and
   stopping sending the fourth uplink information in a slot first in position in the third uplink subframe, wherein the third uplink subframe is the last uplink subframe in the at least one uplink subframe.

8. A communications apparatus, comprising:
   a transceiver;
   a processor; and
   a non-transitory computer-readable storage medium storing a program to be executed by the processor, the program including instructions to:
      receive, through the transceiver, scheduling information from an access network device, wherein the scheduling information indicates at least one uplink subframe, wherein the scheduling information comprises a first indication field a second indication field, and a third indication field, wherein the first indication field indicates whether each of the at least one uplink subframe is applicable to a first mode, wherein the second indication field indicates whether a first uplink subframe is applicable to a second mode, wherein the third indication field indicates whether a third uplink subframe is applicable to a third mode, wherein the at least one uplink subframe comprises the third uplink subframe, and wherein the at least one uplink subframe comprises the first uplink subframe and the third uplink subframe; and
      cause the transceiver to send first uplink information in the first uplink subframe by using the second mode in response to the first indication field indicating that each of the at least one uplink subframe is applicable to the first mode and further in response to the second indication field indicating that the first uplink subframe is applicable to the second mode; and
      perform, in response to the first indication field indicating that each of the at least one uplink subframe is applicable to the first mode, further in response to the second indication field indicating that the first uplink subframe is applicable to the second mode, and further in response to the third indication field indicating that the third uplink subframe is applicable to the third mode:
         send third uplink information in the first uplink subframe by using the second mode; and
         send fourth uplink information in the third uplink subframe by using the third mode.

9. The communications apparatus according to claim 8, wherein the program further includes instructions to:
   control the transceiver to start to send the first uplink information in a slot second in position in of the first uplink subframe, wherein the first uplink subframe is an uplink subframe first in position in the at least one uplink subframe.

10. The communications apparatus according to claim 8, wherein the program further includes instructions to:
    control the transceiver to stop sending the first uplink information in a slot first in position in the first uplink subframe, wherein the first uplink subframe is the last uplink subframe in the at least one uplink subframe.

11. The communications apparatus according to claim 8, wherein the program further includes instructions to:
    control the transceiver to send second uplink information in a second uplink subframe by using the first mode, wherein the second uplink subframe is any uplink subframe other than the first uplink subframe in the at least one uplink subframe.

12. The communications apparatus according to claim 11, wherein the program further includes instructions to:
    determine, according to a channel listening result, that a starting moment for sending the second uplink information in the second uplink subframe is located in a slot first in position in the second uplink subframe or a slot second in position in the second uplink subframe; and
    control the transceiver to send the second uplink information in the second uplink subframe.

13. The communications apparatus according to claim 8, wherein the program further includes instructions to:
    control the transceiver to send fifth uplink information in a second uplink subframe by using the first mode, wherein the second uplink subframe is an uplink subframe other than the first uplink subframe and the third uplink subframe in the at least one uplink subframe.

14. The communications apparatus according to claim 8, wherein the program further includes instructions to:
    control the transceiver to start to send the third uplink information in a slot second in position in the first uplink subframe, wherein the first uplink subframe is the uplink subframe first in position in the at least one uplink subframe;
    control the transceiver to stop sending the fourth uplink information in the slot first in position in the third uplink subframe, wherein the third uplink subframe is the last uplink subframe in the at least one uplink subframe.

15. A non-transitory computer readable storage medium storing a program to be executed by a processor of a terminal device processor, the program including instructions for:
    receiving scheduling information from an access network device, wherein the scheduling information indicates at least one uplink subframe, wherein the scheduling information comprises a first indication field, a second indication field, and a third indication field, wherein the first indication field indicates whether each of the at least one uplink subframe is applicable to a first mode, wherein the second indication field indicates whether a first uplink subframe is applicable to a second mode, wherein the third indication field indicates whether a third uplink subframe is applicable to a third mode, wherein the at least one uplink subframe comprises the third uplink subframe, and wherein the at least one uplink subframe comprises the first uplink subframe and the third uplink subframe;
    sending, in response to the first indication field indicating that each of the at least one uplink subframe is applicable to the first mode and further in response to the second indication field indicating that the first uplink subframe is applicable to the second mode, first uplink information in the first uplink subframe by using the second mode; and
    performing, in response to the first indication field indicating that each of the at least one uplink subframe is applicable to the first mode, further in response to the second indication field indicating that the first uplink subframe is applicable to the second mode, and further in response to the third indication field indicating that the third uplink subframe is applicable to the third mode:
- sending third uplink information in the first uplink subframe by using the second mode; and
- sending fourth uplink information in the third uplink subframe by using the third mode.

16. The non-transitory computer readable storage medium according to claim 15, wherein the program further includes instructions for:
- starting to send the first uplink information in a slot second in position in the first uplink subframe, wherein the first uplink subframe is an uplink subframe first in position in the at least one uplink subframe.

17. The non-transitory computer readable storage medium according to claim 15, wherein the program further includes instructions for:
- stopping sending the first uplink information in a slot first in position in the first uplink subframe, wherein the first uplink subframe is the last uplink subframe in the at least one uplink subframe.

18. The non-transitory computer readable storage medium according to claim 15, wherein the program further includes instructions for:
- sending second uplink information in a second uplink subframe by using the first mode, wherein the second uplink subframe is an uplink subframe other than the first uplink subframe in the at least one uplink subframe.

* * * * *